US011573912B2

(12) United States Patent
     Fukutani

(10) Patent No.: US 11,573,912 B2
(45) Date of Patent: Feb. 7, 2023

(54) MEMORY DEVICE MANAGEMENT SYSTEM, MEMORY DEVICE MANAGEMENT METHOD, AND NON-TRANSITORY COMPUTER-READABLE RECORDING MEDIUM ERASING DATA STORED IN MEMORY DEVICE IF A VALUE OF A FIRST KEY AND SECOND KEY ARE DIFFERENT

(71) Applicant: NEC CORPORATION, Tokyo (JP)

(72) Inventor: Takayuki Fukutani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/088,677

(22) Filed: Nov. 4, 2020

(65) Prior Publication Data

US 2021/0141743 A1    May 13, 2021

(30) Foreign Application Priority Data

Nov. 7, 2019   (JP) .............................. JP2019-202630

(51) Int. Cl.
     *G06F 12/14*    (2006.01)
     *G06F 12/02*    (2006.01)
     (Continued)

(52) U.S. Cl.
     CPC ...... *G06F 12/1466* (2013.01); *G06F 12/0246* (2013.01); *G06F 12/0646* (2013.01); *G06F 21/79* (2013.01); *G06F 2221/0755* (2013.01)

(58) Field of Classification Search
     None
     See application file for complete search history.

(56) References Cited

U.S. PATENT DOCUMENTS

2008/0260144 A1   10/2008  Ozawa
2012/0093318 A1*   4/2012  Obukhov ............ G06F 21/6209
                                                       726/33
(Continued)

FOREIGN PATENT DOCUMENTS

JP           7-219720 A     8/1995
JP       2008-269246 A    11/2008
(Continued)

OTHER PUBLICATIONS

H. A. Khouzani, C. Liu and C. Yang, "Architecting Data Placement in SSDs for Efficient Secure Deletion Implementation," 2018 IEEE/ACM International Conference on Computer-Aided Design (ICCAD), 2018, pp. 1-6, doi: 10.1145/3240765.3240780. (Year: 2018).*

(Continued)

*Primary Examiner* — Jared I Rutz
*Assistant Examiner* — Marwan Ayash

(57) ABSTRACT

A memory device management system includes a first key acquisition unit that acquires a first key, a second key generation unit that generates a second key in accordance with a configuration of a memory device that is a management target, an equality determination unit that determines an equality between a value of the first key and a value of the second key, and a data erasure processing unit that erases data stored in the memory device in a case of a determination that the value of the first key and the value of the second key are different.

7 Claims, 14 Drawing Sheets

(51) Int. Cl.
*G06F 21/79* (2013.01)
*G06F 12/06* (2006.01)

(56) References Cited

U.S. PATENT DOCUMENTS

| | | |
|---|---|---|
| 2013/0024679 A1 | 1/2013 | Isozaki |
| 2013/0238831 A1* | 9/2013 | He .................... G06F 12/0246 711/103 |
| 2013/0275656 A1* | 10/2013 | Talagala ............. G06F 12/0246 711/103 |
| 2016/0232383 A1* | 8/2016 | Chakhaiyar ........... G06F 3/0622 |
| 2017/0060781 A1* | 3/2017 | Soja .................... G06F 12/1466 |
| 2017/0060782 A1* | 3/2017 | Chinnakkonda Vidyapoornachary ...................... G06F 21/88 |
| 2019/0056999 A1* | 2/2019 | Foxworth ............... G06F 21/44 |

FOREIGN PATENT DOCUMENTS

| | | |
|---|---|---|
| JP | 2010-191816 A | 9/2010 |
| JP | 2010-250887 A | 11/2010 |
| JP | 2012-104170 A | 5/2012 |
| JP | 2014-146256 A | 8/2014 |
| WO | 2011/118034 A1 | 9/2011 |

OTHER PUBLICATIONS

Japanese Office Action for JP Application No. 2019-202630 dated Jan. 19, 2021 with English Translation.

* cited by examiner

| LOGICAL ADDRESS | PHYSICAL ADDRESS |
|---|---|
| 1001~2000 | 2001~3000 |
| 3001~4000 | 3400~4400 |
| ⋮ | ⋮ |

FIG. 10

| LOGICAL ADDRESS | ATTRIBUTES | DATA |
|---|---|---|
| 0000~1000 | Read | UNNECESSARY |
| 1001~2000 | Read | NECESSARY |
| 2001~3FFE | Read/Write | UNNECESSARY |
| 3FFF~4500 | Read/Write | NECESSARY |
| ⋮ | ⋮ | ⋮ |

FIG. 11

| No. | DATA | FINAL Read REQUEST DATE/TIME |
|---|---|---|
| 1 | A | 20XX/XX/XX XX:XX:XX |
| 2 | B | 20YY/YY/YY YY:YY:YY |
| ⋮ | ⋮ | ⋮ |

FIG. 12

| No. | NON-VOLATILE MEMORY No. | PERFORMANCE PROPERTIES | CHANGE IN PROPERTIES | WRITE LIFETIME [DWPD] |
|---|---|---|---|---|
| 1 | XXXXXXX | Read HIGH Write HIGH | READ CHANGES FROM HIGH TO LOW WHEN NUMBER OF WRITES EXCEEDS XX | 25 |
| 2 | YYYYYYY | Read HIGH Write MEDIUM | - | 10 |
| ⋮ | ⋮ | ⋮ | ⋮ | ⋮ |

FIG. 13

| PHYSICAL ADDRESS | MEMORY | DEVICE TYPE |
|---|---|---|
| 2001~2500 | PM1 | COMPANY XX MODEL: YY |
| 2501~3000 | PM2 | COMPANY XX MODEL: ZZ |
| 3001~3FFE | PM3 | COMPANY AA MODEL: BB |
| ⋮ | ⋮ | ⋮ |

MEMORY DEVICE MANAGEMENT SYSTEM, MEMORY DEVICE MANAGEMENT METHOD, AND NON-TRANSITORY COMPUTER-READABLE RECORDING MEDIUM ERASING DATA STORED IN MEMORY DEVICE IF A VALUE OF A FIRST KEY AND SECOND KEY ARE DIFFERENT

CROSS REFERENCE TO RELATED APPLICATIONS

This application is based upon and claims the benefit of priority from Japanese patent application No. 2019-202630, filed on Nov. 7, 2019, the disclosure of which is incorporated herein in its entirety by reference.

TECHNICAL FIELD

The present invention relates to a memory device management system, a memory device management method, and a non-transitory computer-readable recording medium.

BACKGROUND ART

Regarding storage devices using non-volatile memories, Japanese Unexamined Patent Application, First Publication No. Hei 7-219720 (hereinafter referred to as "Patent Document 1") describes a semiconductor disk that is provided with a data storage unit composed of a plurality of flash memories. The semiconductor disk includes a first table that converts a logical block address designated for accessing data by a higher-level computer into a real block address in the data storage unit and a second table that stores flag information for managing the state of data at the real block address.

When writing data, the semiconductor disk uses the first table to convert a logical block address that has been designated for writing the data into a real block address. Then, the semiconductor disk sets an "invalid block" flag (a flag indicating that the data is invalid) in an area of the second table corresponding to the real block address.

Additionally, the semiconductor disk searches the second table and retrieves a real block address at which an "empty block" flag (a flag indicating an empty block in which data can be written) is set in the data storage unit. Then, the semiconductor disk writes data at the real block address at which the "empty block" flag is set, and sets a "valid block" flag (a flag indicating that valid data is being stored) in an area of the second table corresponding to that real block address. Then, the semiconductor disk sets the value of the real block address in an area of the first table corresponding to the designated logical block address.

Additionally, the semiconductor disk performs an erasure process for updating the invalid blocks to empty blocks. In the erasure process, the semiconductor disk erases the data in the real blocks for which "invalid block" flags are set in the second table, and updates the flags of these real blocks in the second table to "empty block" flags.

SUMMARY

In storage devices using non-volatile memories, the data is maintained even when the power source is disconnected. It is preferable to be able to make effective use of the data while also preventing illegitimate acquisition of the data.

The present invention has an example object of providing a memory device management system, a memory device management method, and a non-transitory computer-readable recording medium that can solve the abovementioned problems.

A first example aspect of the present invention is a memory device management system that includes: a memory configured to store instructions; and a processor configured to execute the instructions to: acquire a first key; generate a second key in accordance with a configuration of a memory device that is a management target; determine an equality between a value of the first key and a value of the second key; and erase data stored in the memory device in a case of a determination that the value of the first key and the value of the second key are different.

A second example aspect of the present invention is a memory device management method that includes: acquiring a first key; generating a second key in accordance with a configuration of a memory device that is a management target; determining an equality between a value of the first key and a value of the second key; and erasing data stored in the memory device in a case of a determination that the value of the first key and the value of the second key are different.

A third example aspect of the present invention is a non-transitory computer-readable recording medium that stores a program for causing a computer to execute: acquiring a first key; generating a second key in accordance with a configuration of a memory device that is a management target; determining an equality between a value of the first key and a value of the second key; and erasing data stored in the memory device in a case of a determination that the value of the first key and the value of the second key are different.

With the present invention, it is possible to make effective use of data stored in a storage device using non-volatile memories while also preventing illegitimate acquisition of the data.

BRIEF DESCRIPTION OF THE DRAWINGS

FIG. 10 is a diagram illustrating an example of the data structure in an address management table in accordance with the second example embodiment.

FIG. 11 is a diagram illustrating an example of the data structure in a data management table in accordance with the second example embodiment.

FIG. 12 is a diagram illustrating an example of the data structure in a non-volatile memory device property table in accordance with the second example embodiment.

FIG. 13 is a diagram illustrating an example of the data structure in a non-volatile memory management table in accordance with the second example embodiment.

EXAMPLE EMBODIMENT

While example embodiments of the present invention will be described below, the example embodiments below should not be construed as limiting the claimed invention. Additionally, not all combinations of the features described in the example embodiments are necessarily essential as means for solving the problems addressed by the invention.

Examples of Data Management Targets

Figure 1:
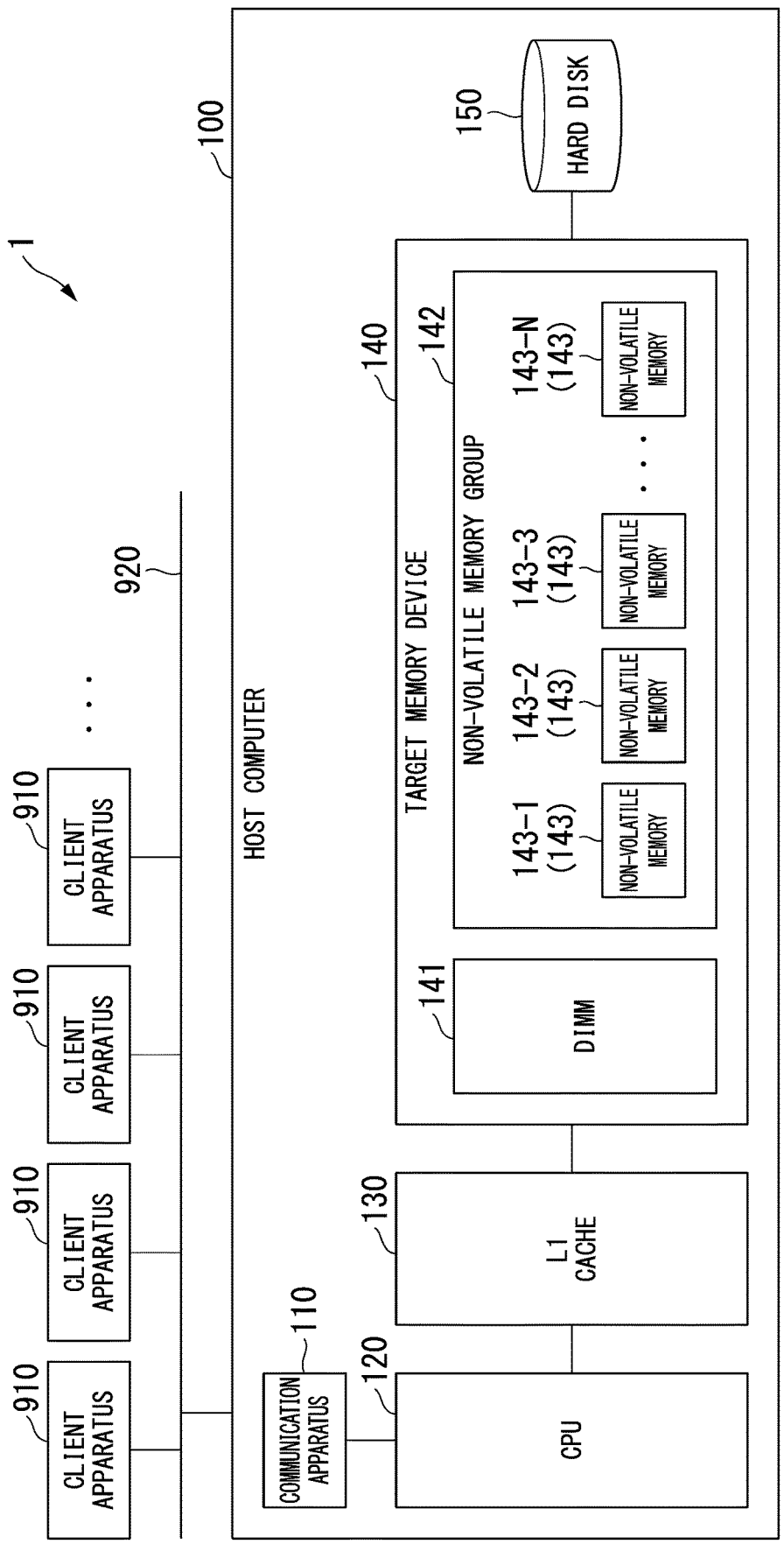
FIG. 1 is a schematic block diagram illustrating the configuration of the apparatuses in a server client system in accordance with an example embodiment.

FIG. 1 is a schematic block diagram illustrating the configuration of the apparatuses in a server client system in accordance with an example embodiment. In the configuration illustrated in FIG. 1, the server client system 1 includes a host computer 100 and client apparatuses 910. The host computer 100 includes a communication apparatus 110, a central processing unit (CPU) 120, an L1 cache 130, a target memory device 140, and a hard disk 150. The target memory device 140 includes a dual inline memory module (DIMM) 141 and a non-volatile memory group 142. The non-volatile memory group 142 includes non-volatile memories 143-1 to 143-N (where N is an integer such that N≥1). The non-volatile memories 143-1 to 143-N will be referred to collectively as the non-volatile memories 143.

The host computer 100 and the client apparatuses 910 communicate via a communication network 920.

The host computer 100, as the server in the server client system 1, provides functions requested by the client apparatuses 910 by performing processes in accordance with requests from the client apparatuses 910 and transmitting responses. The host computer 100 is configured by using a computer such as a workstation or a personal computer (PC) such as a PC server.

The communication apparatus 110 communicates with other apparatuses. For example, the communication apparatus 110 receives requests from the client apparatuses 910. Additionally, the communication apparatus 110 transmits, to the client apparatuses 910, responses to the requests.

The CPU 120 executes various processes by executing programs. For example, the CPU 120 runs software such as applications (application software), an operating system (OS), and a basic input/output system (BIOS).

The L1 cache 130 is a cache memory for increasing the speed of reading and writing of data with respect to the CPU 120. The L1 cache 130 is configured by using a volatile memory.

However, the configuration of the cache in the host computer 100 is not limited to that illustrated in FIG. 1. For example, there may be two or more cache stages between the CPU 120 and the target memory device 140. Alternatively, the CPU 120 may be connected directly to the target memory device 140 without a cache therebetween.

The target memory device 140 is a memory device that is a management target. In the example illustrated in FIG. 1, the target memory device 140 is used as the main storage apparatus. The target memory device 140 is slower (for example, having a longer latency and lower throughput) than the L1 cache 130. In contrast, the target memory device 140 has a larger memory capacity than the L1 cache 130 does. Additionally, the target memory device 140 is faster than the hard disk 150. In contrast, the target memory device 140 has a smaller memory capacity than the hard disk 150 does.

However, the method of use of the target memory device 140 is not limited.

The DIMM 141 is a memory module on which a plurality of dynamic random access memories (DRAMs) are mounted. In the example illustrated in FIG. 1, the DIMM 141 is used as a portion of a main storage apparatus. In other words, the storage area of the DIMM 141 constitutes a portion of the storage area of the target memory device 140, which is the main storage apparatus.

In the non-volatile memory group 142, each of the non-volatile memories 143, which are memories that are non-volatile, store data.

In the first example embodiment described below, it is sufficient for the non-volatile memory group 142 to be provided with one or more non-volatile memories 143. Therefore, as mentioned above, it is sufficient for the number N of non-volatile memories 143 provided in the non-volatile memory group 142 to be an integer greater than or equal to one. If the non-volatile memory group 142 is provided with multiple non-volatile memories 143, in the first example embodiment, these multiple non-volatile memories 143 may be the same type of memory, or they may be different types of memory. As the type of memory mentioned here, it is possible to use a type on the level of model numbers. In this case, memories from the same manufacturer and having the same model number are considered to be the same type of memory, and memories from different manufacturers or having different model numbers are considered to be different types of memory.

In the second example embodiment, it is sufficient for the non-volatile memory group 142 to be provided with two or more non-volatile memories 143. Therefore, it is sufficient for the number N to be an integer greater than or equal to two. Additionally, in the second example embodiment, one or more of the multiple non-volatile memories 143 may be a type of memory that is different from the other non-volatile memories 143. Therefore, the multiple non-volatile memories 143 may all be different types of memory, or some of the multiple non-volatile memories 143 may be non-volatile memories 143 of the same type.

In the third example embodiment also, it is sufficient for the non-volatile memory group 142 to be provided with one or more non-volatile memories 143, as in the case of the first example embodiment. Therefore, it is sufficient for N to be an integer greater than or equal to one. If the non-volatile memory group 142 is provided with multiple non-volatile memories 143, in the third example embodiment, these multiple non-volatile memories 143 may be the same type of memory, or they may be different types of memory.

The storage area in the non-volatile memory group 142 constitutes a portion of the storage area of the target memory device 140.

The hard disk 150 is a non-volatile storage device that is slower than the target memory device 140 and that has a larger capacity than the target memory device 140 does.

The client apparatuses 910, as clients in the server client system 1, transmit requests to the host computer 100 and receive responses to the transmitted requests.

The client apparatuses 910 are configured by using computers, such as personal computers.

The communication network 920 mediates communication between the host computer 100 and the client apparatuses 910. The communication network 920 is not limited to being a specific type of communication network. For example, the communication network 920 may be configured by using the internet, or it may be configured as a communication network dedicated to the server client system 1.

The communication network 920 may be configured as a portion of the server client system 1 or it may be configured so as to be external to the server client system 1.

First Example Embodiment

Figure 2:
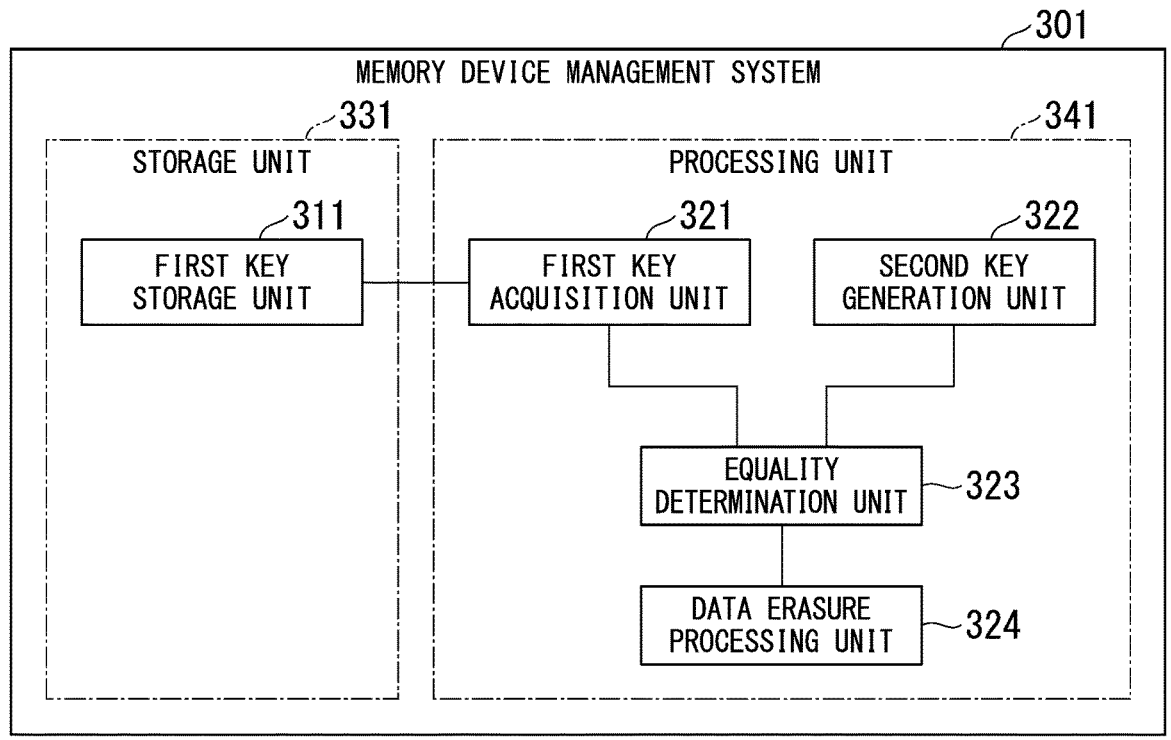
FIG. 2 is a schematic block diagram illustrating the functional configuration of a memory device management system in accordance with a first example embodiment.

FIG. 2 is a schematic block diagram illustrating the functional configuration of a memory device management system in accordance with the first example embodiment. In the configuration illustrated in FIG. 2, a memory device management system 301 includes a first key storage unit 311, a first key acquisition unit 321, a second key generation unit 322, an equality determination unit 323, and a data erasure processing unit 324.

Additionally, in FIG. 2, each unit in the memory device management system 301 is included in a storage unit 331 or a processing unit 341. The first key storage unit 311 is included in the storage unit 331. The first key acquisition unit 321, the second key generation unit 322, the equality determination unit 323, and the data erasure processing unit 324 are included in the processing unit 341.

The memory device management system 301 manages the target memory device 140 (FIG. 1). In the first example embodiment, at the time of startup of the host computer 100, the memory device management system 301 determines whether or not it is necessary to erase the data in the non-volatile memories 143 (data stored in the non-volatile memories 143), and erases the data when it is determined that the data needs to be erased.

The memory device management system 301 is configured by using a computer, for example, a client apparatus 910 (FIG. 1). If the memory device management system 301 is configured by using a client apparatus 910, then the functions of the memory device management system 301 may be executed by any of an application, an OS, or a BIOS, or a combination thereof, executed by a CPU in the client apparatus 910. Alternatively, all or some of the functions of the memory device management system 301 may be executed by the target memory device 140. In this case, the target memory device 140 may include a processor for executing the functions of the memory device management system 301.

The storage unit 331 stores various types of data. The storage unit 331 is configured by using a storage device in an apparatus constituting the memory device management system 301.

The first key storage unit 311 stores a first key. The first key is a code used for determining whether or not all of some of the target memory device 140 may be taken out.

Taking out all or some of the target memory device 140 in this case means removing all or some of the target memory device 140 from the apparatus in which it was originally mounted and mounting it in another apparatus. The non-volatile memories 143 continue to store the data even while in a state in which a supply of power is not being received. For this reason, if the target memory device 140 or a non-volatile memory 143 is removed from the apparatus in which it was originally mounted and the data stored in the removed target memory device 140 or a non-volatile memory 143 is referenced by another apparatus, then there is a possibility that the data will be illegitimately referenced.

Therefore, the memory device management system 301 determines whether or not the target memory device 140 and the non-volatile memories 143 in the target memory device 140 are those that were originally mounted in the host computer 100 before the power source of the host computer 100 was disconnected, by determining the equality between the value of the first key that was stored before the power source of the host computer 100 was disconnected (turned OFF) and the value of a second key generated after the power source of the host computer 100 was connected (turned ON). When it is determined that the entire target memory device 140 or a non-volatile memory 143 was mounted in the host computer 100 after the power source of the host computer 100 was disconnected, the memory device management system 301 erases the data stored in the target memory device 140 (the data stored in each of the non-volatile memories 143 in the non-volatile memory group 142).

Thus, it is possible to avoid situations in which the data stored in the target memory device 140 or a non-volatile memory 143 is illegitimately referenced, or to reduce the possibility that the data stored in the target memory device 140 or a non-volatile memory 143 will be illegitimately referenced.

The first key storage unit 311 is provided in a non-volatile storage device that is external to the target memory device 140. For example, some of the storage areas in the hard disk 150 may be used as storage areas for the first key storage unit 311.

The processing unit 341 executes various processes in the memory device management system 301.

The first key acquisition unit 321 acquires a first key. The first key acquisition unit 321, at the time of startup of the host computer 100 (for example, at the time of execution of a startup sequence), acquires a first key that is stored in the first key storage unit 311 before the power source of the host computer 100 was disconnected (for example, at the time of shutdown). The time of startup of the host computer 100 corresponds to an example of a time after the power source to the host computer 100 is connected.

Hereinafter, the case in which the first key acquisition unit 321 itself generates the first key and stores the first key in the first key storage unit 311 will be explained as an example. However, a functional unit for generating the first key may be provided separately from the first key acquisition unit 321. For example, the target memory device 140 may generate the first key and the CPU 120 may execute the functions of the first key acquisition unit 321.

In the case in which the first key acquisition unit 321 generates the first key, the first key acquisition unit 321 generates the first key before the power source of the host computer 100 is disconnected and stores the first key in the first key storage unit 311.

The first key acquisition unit 321 may generate the first key by using data indicating the configuration of the non-volatile memories 143 in the target memory device 140. For example, the first key acquisition unit 321 may acquire, from the target memory device 140, information depending on the configuration of the non-volatile memories 143 in the target memory device 140, such as the serial numbers of the non-volatile memories 143 constituting the target memory device 140, and may compute the first key by applying a hash function thereto.

Alternatively, the first key acquisition unit 321 may generate the first key by using data stored in the non-volatile memories 143. For example, when the host computer 100 is shutting down and in a state in which the data in the non-volatile memories 143 cannot be overwritten until shutdown is completed, the first key acquisition unit 321 may acquire data stored in each of the non-volatile memories 143, or may acquire some of the data from each of the non-volatile memories 143, and may compute the first key by applying a hash function thereto.

Alternatively, the first key acquisition unit 321 may acquire a first key that has been generated. For example, in the case in which the functions of the first key acquisition unit 321 are executed by the CPU 120 and the first key is generated by the target memory device 140, the first key acquisition unit 321 may acquire the first key generated by the target memory device 140.

The second key generation unit 322 generates a second key depending on the configuration of the target memory device 140. The second key generation unit 322 generates the second key at the time of startup of the host computer 100. The second key generation unit 322 generates the second key by the same generation method as the generation method of the first key. If, at the time the first key is generated and at the time the second key is generated, the target memory device 140 is mounted in the host computer 100 and the configuration of the target memory device 140 is the same in both cases, then the value of the first key and the value of the second key will be the same.

The second key generation unit 322 may generate both the first key and the second key. For example, before the power source of the host computer 100 is disconnected, the second key generation unit 322 may generate the first key and store the first key in the first key storage unit 311. Furthermore, at the time of startup of the host computer 100, the second key generation unit 322 may generate the second key.

The equality determination unit 323 determines the equality between the value of the first key and the value of the second key. Specifically, the equality determination unit 323 determines whether or not the value of the first key and the value of the second key are the same (equal). Due to this determination, it can be determined whether or not, at the time the first key is generated (before the power source of the host computer 100 is disconnected) and at the time the second key is generated (at the time of startup of the host computer 100), the target memory device 140 is mounted in the host computer 100 and the configuration of the target memory device 140 is the same in both cases.

The data erasure processing unit 324 causes the data stored in the target memory device 140 to be erased if it is determined that the value of the first key and the value of the second key are different. As a result thereof, as mentioned above, it is possible to prevent illegitimate referencing of the data stored in the target memory device 140 or the non-volatile memories 143 and to reduce the possibility that the data stored in the target memory device 140 or the non-volatile memories 143 is illegitimately referenced.

Figure 3:
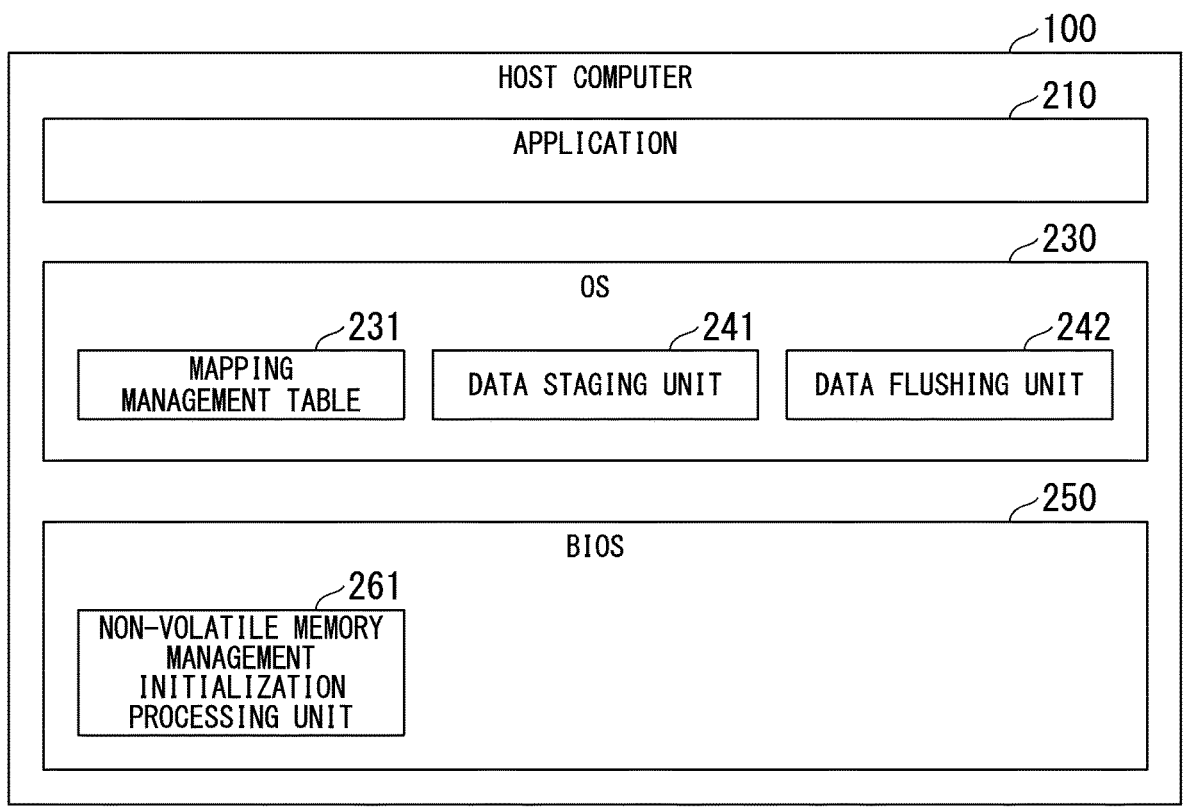
FIG. 3 is a diagram illustrating an example of the allocation of functions of a memory device management system to software in a host computer in accordance with the first example embodiment.

FIG. 3 is a diagram illustrating an example of the allocation of the functions of the memory device management system 301 to software in the host computer 100. In the configuration illustrated in FIG. 3, the host computer 100 includes an application 210, an OS 230, and a BIOS 250. In other words, the host computer 100 runs the application 210, the OS 230, and the BIOS 250.

The OS 230 includes a mapping management table 231, a data staging unit 241, and a data flushing unit 242. In other words, as some of the functions of the OS 230, the host computer 100 stores the mapping management table 231, and executes the functions of the data staging unit 241 and the functions of the data flushing unit 242.

The BIOS 250 includes a non-volatile memory management initialization processing unit 261. In other words, the host computer 100, as some of the functions of the BIOS 250, executes the functions of the non-volatile memory management initialization processing unit 261.

The application 210 is an application that is run by the CPU 120. The number of applications run by the CPU 120 is not limited to a specific number. The CPU 120 may run multiple applications.

The OS 230 is an OS run by the CPU 120.

The mapping management table 231 is data indicating the mapping (correspondence) of logical addresses in the target memory device 140 to physical addresses.

Figures 4, 5:
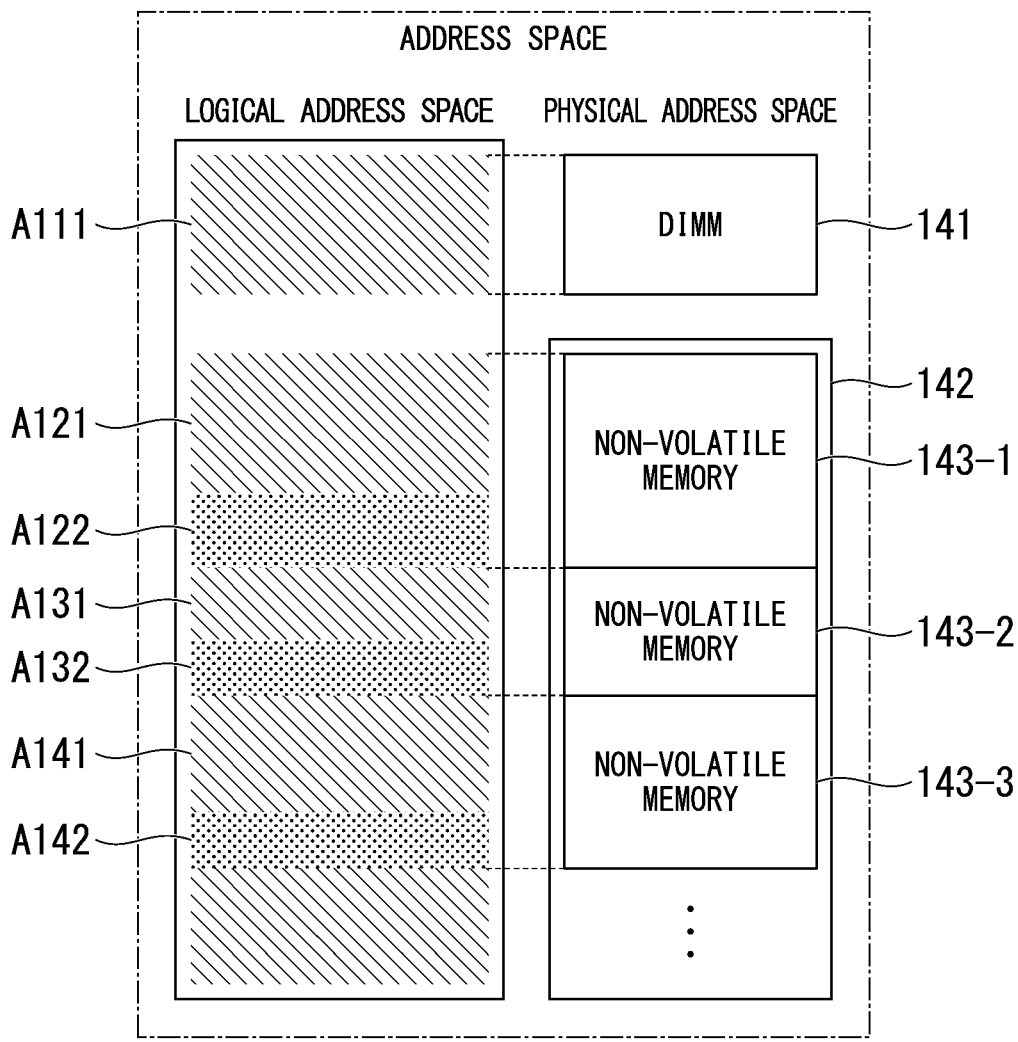
FIG. 4 is a diagram illustrating an example of address space in a target memory device in accordance with the first example embodiment.
FIG. 5 is a diagram illustrating an example of the data structure in a mapping management table in accordance with the first example embodiment.

FIG. 4 is a diagram illustrating an example of address space in the target memory device 140. In the example illustrated in FIG. 4, the correspondence between the logical address space in the target memory device 140 and the physical address space in the target memory device 140 is illustrated.

The area A111 is a logical address area to which physical addresses in the DIMM 141 are assigned. Since the DIMM 141 is volatile, at the time of startup of the host computer 100, the data in the area A111 is erased.

The areas A121 and A122 are both logical address areas to which physical addresses in the non-volatile memory 143-1 are assigned. In the area A121, data staged in the non-volatile memory, such as a business intelligence (BI) tool, is stored. The staging mentioned here refers to the consolidation and storage of data in a faster device. Data relating to the OS 230, data relating to the application 210, and the like are stored in the area A122.

The areas A131 and A132 are both logical address areas to which physical addresses in the non-volatile memory 143-2 are assigned. The area A131 stores data that is staged in the non-volatile memory, such as a BI tool. Data relating to the OS 230, data relating to the application 210, and the like are stored in the area A132.

The areas A141 and A142 are both logical address areas to which physical addresses in the non-volatile memory 143-3 are assigned. The area A141 stores data that is staged in the non-volatile memory, such as a BI tool. Data relating to the OS 230, data relating to the application 210, and the like are stored in the area A142.

If it is determined, by processing in the equality determination unit 323 (FIG. 2), that the value of the first key and the value of the second key are the same, then none of the data in the areas A121, A122, A131, A132, A141, and A142 is erased (the data is maintained) at the time of startup of the host computer 100.

FIG. 5 is a diagram illustrating an example of the data structure in the mapping management table 231. In the example illustrated in FIG. 5, the mapping management table 231 is configured as data in tabular form, wherein each row indicates the correspondence between logical addresses and physical addresses.

In each row of the mapping management table 231, a "Logical address" column and a "Physical address" column are provided. In the "Logical address" column, logical address areas (partial spaces in the logical address space) are indicated by the start address and the last address. In the "Physical address" column, physical address areas (partial spaces in the physical address space) are indicated by the start address and the last address. A physical address area indicated by the "Physical address" column of the first row of the mapping management table 231 is assigned to the logical address area indicated by the "Logical address" column in the first row of the mapping management table 231.

The data staging unit 241 stages data in the physical address space. The data flushing unit 242 flushes the data in the physical address space. The flushing of data mentioned here refers to writing data that is being prepared in a volatile device into a non-volatile device in order to preserve the integrity of the data.

The BIOS 250 is a BIOS run by the CPU 120.

The non-volatile memory management initialization processing unit 261 executes the functions of the memory device management system 301. Specifically, the non-volatile memory management initialization processing unit 261 executes the functions of the first key acquisition unit 321, the second key generation unit 322, the equality determination unit 323, and the data erasure processing unit 324. Additionally, the non-volatile memory management initialization processing unit 261 executes the functions of the first key storage unit 311 by storing a first key obtained by executing the functions of the first key acquisition unit 321 in a non-volatile storage device such as the hard disk 150.

In this way, FIG. 3 illustrates an example for the case in which the functions of the memory device management system 301 are executed by the BIOS 250. However, as mentioned above, the method for executing the functions of the memory device management system 301 is not limited to the method executed by the BIOS 250.

Next, the operations of the memory device management system 301 will be explained with reference to FIG. 6 and FIG. 7.

Figure 6:
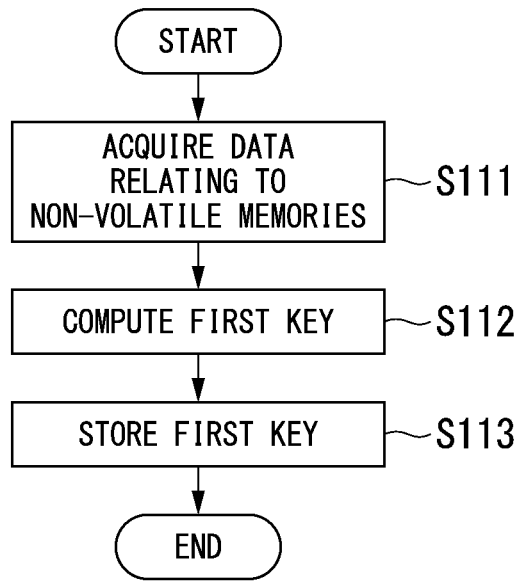
FIG. 6 is a diagram illustrating an example of the procedure in a process by which the memory device management system in accordance with the first example embodiment generates and stores a first key.

FIG. 6 is a diagram illustrating an example of the procedure in the process by which the memory device management system 301 generates and stores a first key.

In the process illustrated in FIG. 6, the first key acquisition unit 321 acquires data relating to the non-volatile memories 143 (step S111). Specifically, the first key acquisition unit 321 acquires data that is uniquely determined in accordance with the configuration of the non-volatile memories 143 in the non-volatile memory group 142. For example, the first key acquisition unit 321 may acquire the serial numbers of all of the non-volatile memories 143 in the non-volatile memory group 142. Alternatively, the first key acquisition unit 321 may acquire, from each of the non-volatile memories 143 in the non-volatile memory group 142, all or some of the data stored in that non-volatile memory 143.

Next, the first key acquisition unit 321 computes the first key on the basis of the data obtained in step S111 (step S112). The first key acquisition unit 321 uses the data obtained in step S111 to compute, as the first key, a key that has a different value for a different configuration of the non-volatile memories 143 in the target memory device 140.

The first key acquisition unit 321 stores the generated first key in the first key storage unit 311 (step S113).

After step S113, the memory device management system 301 ends the process illustrated in FIG. 6.

The memory device management system 301 may perform the process illustrated in FIG. 6 immediately before disconnecting the power source of the host computer 100, such as by the memory device management system 301 performing the process illustrated in FIG. 6 in a shutdown sequence of the host computer 100. Alternatively, if the memory device management system 301 generates the first key using data stored in the non-volatile memories 143, then the memory device management system 301 may perform the process illustrated in FIG. 6 each time the data in one of the non-volatile memories 143 is updated.

Figure 7:
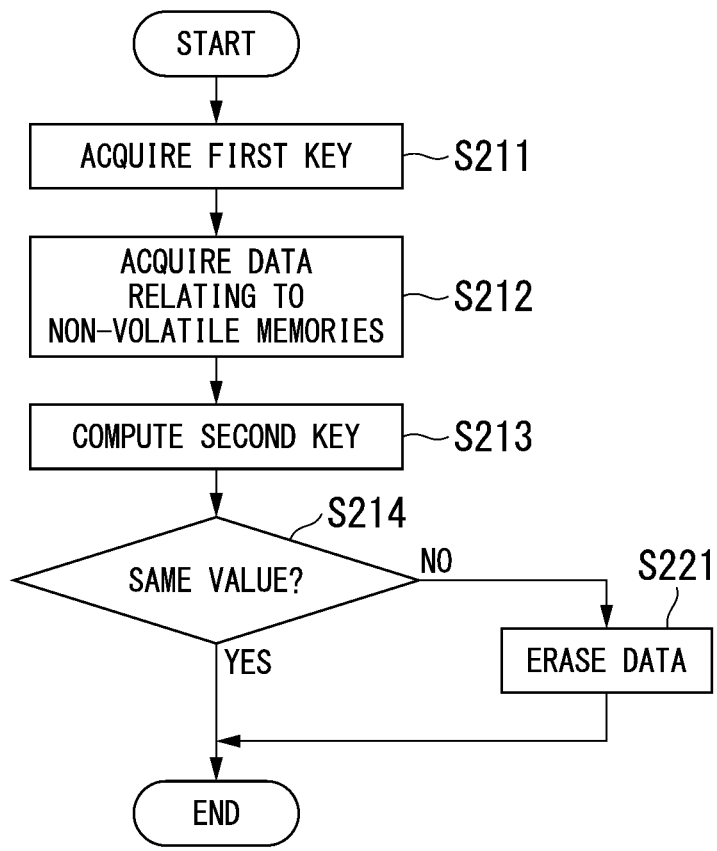
FIG. 7 is a diagram illustrating an example of the procedure in a process performed on data in a target memory device by the memory device management system in accordance with the first example embodiment.

FIG. 7 is a diagram illustrating an example of the procedure in a process performed on data in the target memory device 140 by the memory device management system 301.

In the process illustrated in FIG. 7, the equality determination unit 323 reads out the first key stored in the first key storage unit 311 (step S211).

Additionally, the second key generation unit 322 acquires data relating to the non-volatile memories 143 (step S212). Next, the second key generation unit 322 computes the second key on the basis of the data obtained in step S212 (step S213). The processes in steps S212 and S213 are similar to the processes in steps S111 and S112 illustrated in FIG. 6, aside from difference between the first key and the second key. If the value of the data obtained in step S111 and the value of the data obtained in step S212 are the same, then the value of the first key and the value of the second key will be the same. In contrast, if the value of the data obtained in step S111 and the value of the data obtained in step S212 are different, then the value of the first key and the value of the second key will be different.

Next, the equality determination unit 323 determines whether or not the value of the first key and the value of the second key are the same (step S214). If the equality determination unit 323 determines that the value of the first key and the value of the second key are the same (step S214: YES), then the memory device management system 301 ends the process illustrated in FIG. 7. In this case, the data stored in the non-volatile memories 143 is not erased.

In contrast, if the equality determination unit 323 determines that the value of the first key and the value of the second key are the same (step S214: NO), then the data erasure processing unit 324 erases the data stored in the non-volatile memories 143 (step S221). Specifically, for all of the non-volatile memories 143 in the non-volatile memory group 142, the data erasure processing unit 324 erases all of the data stored in those non-volatile memories 143.

After step S221, the memory device management system 301 ends the process illustrated in FIG. 7.

As described above, the first key acquisition unit 321 acquires a first key. The second key generation unit 322 generates a second key in accordance with the configuration in the target memory device 140. The equality determination unit 323 determines the equality between the value of the first key and the value of the second key. If it is determined that the value of the first key and the value of the second key are different, then the data erasure processing unit 324 erases the data stored in the target memory device 140.

In the case in which the configuration of the non-volatile memories 143 in the target memory device 140 has been changed, and in the case in which the target memory device 140 has been removed from another apparatus and mounted in the host computer 100, there is a possibility that a change has been illegitimately made by an unauthorized person. The memory device management system 301 compares the value of the first key with the value of the second key, and thus it is possible to detect cases in which the configuration of the non-volatile memories 143 in the target memory device 140 has been changed and cases in which the target memory device 140 has been removed from another apparatus and mounted in the host computer 100.

In the case in which a change in the configuration of the non-volatile memories 143 is not detected, the probability that there has been illegitimate activity can be considered to be relatively low. In this case, the memory device management system 301 does not erase the data stored in the target memory device 140. By making use of data stored in the target memory device 140, there is no need, for example, to reupload data from the hard disk 150 to the target memory device 140. For this reason, it is possible to ensure that the data stored in the target memory device 140 is effectively used.

In contrast, in the case in which a change in the configuration of the non-volatile memories 143 is detected, the probability that there has been illegitimate activity can be considered to be relatively high. In this case, the memory device management system 301 erases the data stored in the target memory device 140. As a result thereof, the possibility that the data stored in the target memory device 140 has been illegitimately acquired can be reduced. For this reason, it is possible to ensure the prevention of illegitimate activity on the data stored in the target memory device 140.

With the memory device management system 301, it is possible to ensure the effective use of the data stored in the target memory device 140 while also preventing illegitimate acquisition of the data.

In order to prevent a first key and a second key from being generated illegitimately, the generation method of these keys may be undisclosed. For example, a function in which it is difficult to deduce the function from the inputs and outputs of the function, such as a hash function, may be used to generate these keys, and this hash function may be undisclosed. Thus, even when an unauthorized person has acquired the data that is input to the hash function, it is possible to prevent a first key or a second key from being generated illegitimately, or to reduce the probability that a first key or a second key will be generated illegitimately.

In the case in which the functions of the equality determination unit 323 are provided external to the target memory device 140, such as in the CPU 120, the determination results of the equality between the value of the first key and the value of the second key or the instructions to erase the data in the target memory device 140 must be output from the CPU 120 or the like to the target memory device 140. If these determination results or data erasure instructions are illegitimately modified or blocked, then there is a possibility that the data stored in the target memory device 140 will not be appropriately erased.

Therefore, measures may be taken to prevent illegitimate activity with respect to notifications of the equality determination results between the value of the first key and the value of the second key, such as by concealing the processes of the equality determination unit 323 in a black box.

For example, in the case in which the functions of the equality determination unit 323 are executed by a BIOS 250, the BIOS 250 may be concealed in a black box.

As a result thereof, it can be expected to become more difficult to modify the determination results. Furthermore, the data erasure processing unit 324 may be provided in the target memory device 140, and the data erasure processing unit 324 may also be concealed in a black box.

Additionally, as a failsafe for preventing illegitimate acquisition of the data stored in the target memory device 140, the data erasure processing unit 324 may erase the data stored in the target memory device 140 in the case in which an appropriate determination result is not obtained at a prescribed timing.

Second Example Embodiment

Figure 8:
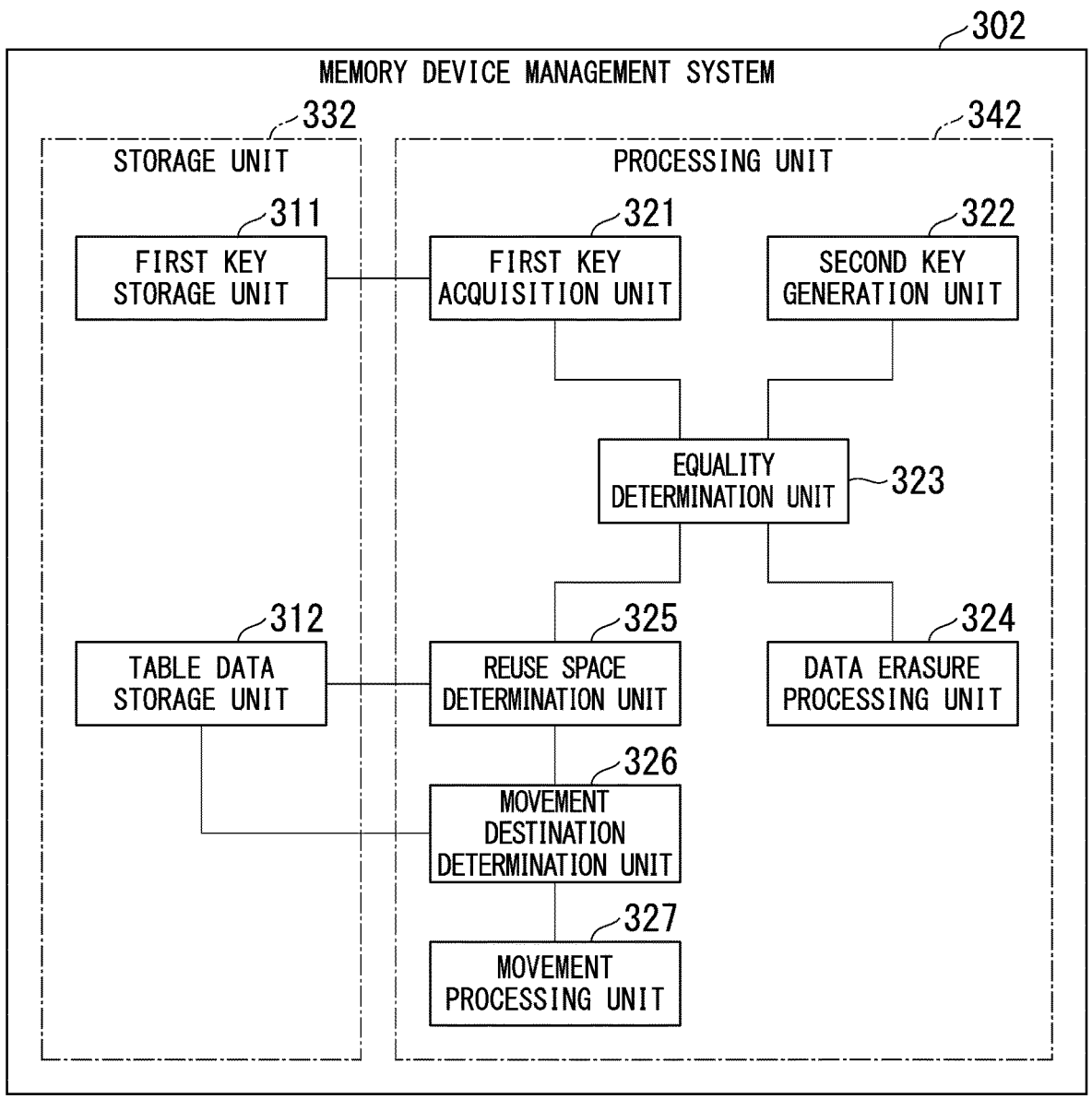
FIG. 8 is a diagram illustrating an example of the functional configuration of a memory device management system in accordance with a second example embodiment.

FIG. 8 is a diagram illustrating an example of the functional configuration of a memory device management system in accordance with the second example embodiment. In the configuration illustrated in FIG. 8, a memory device management system 302 includes a first key storage unit 311, a table data storage unit 312, a first key acquisition unit 321, a second key generation unit 322, an equality determination unit 323, a data erasure processing unit 324, a reuse space determination unit 325, a movement destination determination unit 326, and a movement processing unit 327.

Additionally, in FIG. 8, each unit in the memory device management system 302 is included in a storage unit 332 or a processing unit 342. The first key storage unit 311 and the table data storage unit 312 are included in a storage unit 332. The first key acquisition unit 321, the second key generation unit 322, the equality determination unit 323, the data erasure processing unit 324, the reuse space determination unit 325, the movement destination determination unit 326, and the movement processing unit 327 are included in a processing unit 342.

Of the units illustrated in FIG. 8, the explanations of the portions having similar functions corresponding to those of the units in FIG. 2 will be assigned the same reference numbers (311, 321, 322, 323, and 324) and their explanations will be omitted. The memory device management system 302 differs from the memory device management system 301 (FIG. 2) in that the storage unit 332 includes the table data storage unit 312, and the processing unit 342 includes the reuse space determination unit 325, the movement destination determination unit 326, and the movement processing unit 327. With respect to the other units, the memory device management system 302 is similar to the memory device device management system 301, the storage unit 332 is similar to the storage unit 331, and the processing unit 342 is similar to the processing unit 341.

The table data storage unit 312 stores data for determining the data that is to be reused among the data stored in the target memory device 140, and data for determining the arrangement of the data that has been determined to be reused. The table data storage unit 312 stores, for example, an address management table, a non-volatile memory management table, a data management table, and a non-volatile memory device property table, as will be described below.

The reuse space determination unit 325 determines the data that is to be reused among the data stored in the target memory device 140. In the first example embodiment, in the case in which it is determined that the value of the first key and the value of the second key are the same, all of the data stored in the target memory device 140 is maintained (the data is not erased). In contrast, in the second example embodiment, in the case in which it is determined that the value of the first key and the value of the second key are the same, the reuse space determination unit 325 determines the data that is to be reused among the data stored in the target memory device 140. The data other than the data that has been determined to be reused is erased.

The movement destination determination unit 326 determines the movement destination of the data that has been determined to be reused among the data stored in the target memory device 140. For example, the movement destination determination unit 326 determines non-volatile memories 143 having relatively short data read times as the movement destinations of data with relatively high read frequencies on the basis of the read frequency and the write frequency of the data that has been determined to be reused. Additionally, the movement destination determination unit 326 determines non-volatile memories 143 having relatively short data write times as the movement destinations of data with relatively high write frequencies. Thus, the reading and writing of data with respect to the target memory device 140 can be made faster.

The movement processing unit 327 moves the data that has been determined to be reused to the movement destinations determined by the movement destination determination unit 326.

Figure 9:
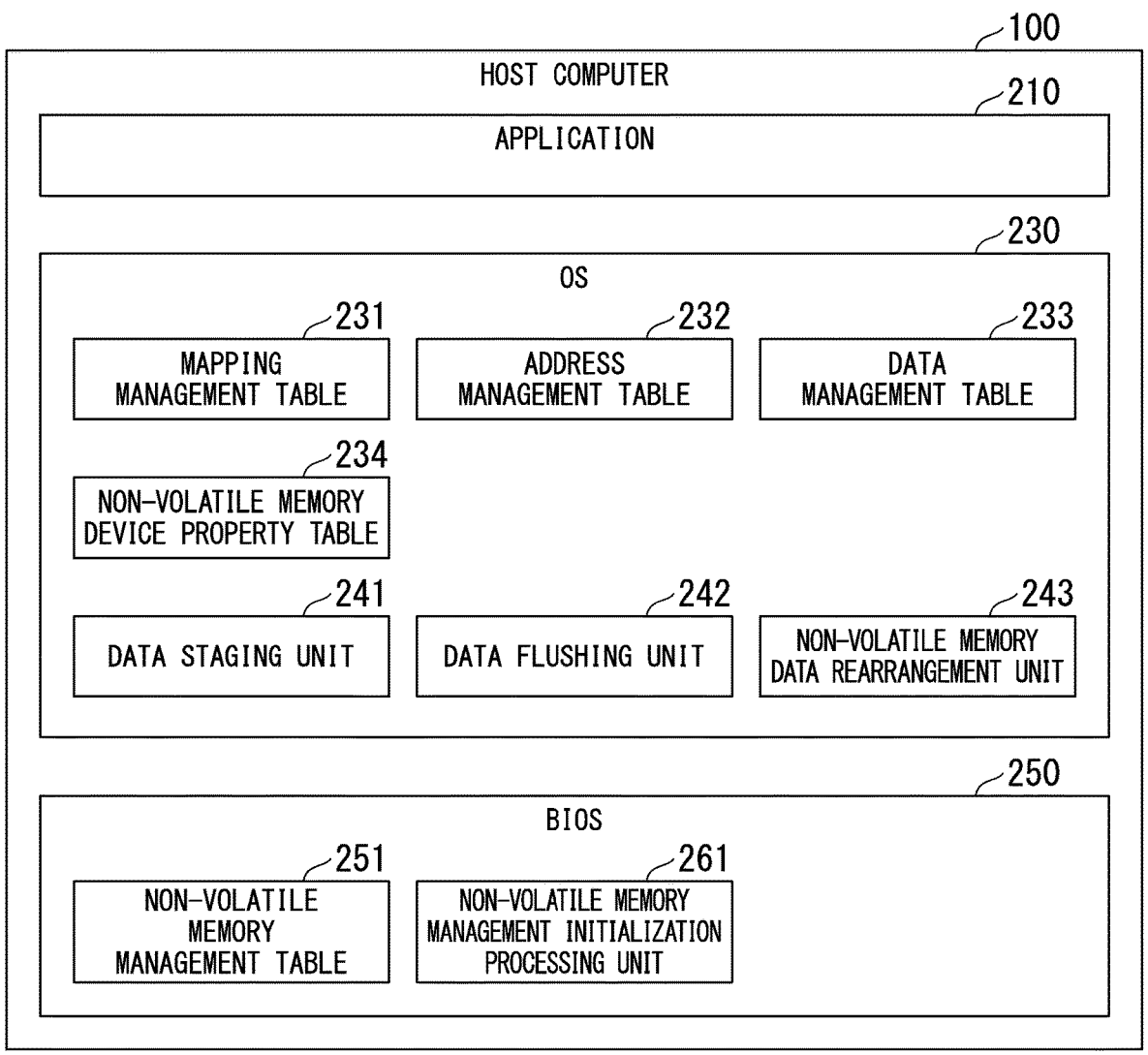
FIG. 9 is a diagram illustrating an example of the allocation of the functions of the memory device management system to software in a host computer in accordance with the second example embodiment.

FIG. 9 is a diagram illustrating an example of the allocation of the functions of the memory device management system 302 to software in the host computer 100. In the configuration illustrated in FIG. 9, the host computer 100 includes an application 210, an OS 230, and a BIOS 250. In other words, the host computer 100 runs the application 210, the OS 230, and the BIOS 250.

The OS 230 includes a mapping management table 231, an address management table 232, a data management table 233, a non-volatile memory device property table 234, a data staging unit 241, a data flushing unit 242, and a non-volatile memory data rearrangement unit 243. In other words, the host computer 100 stores, as some of the functions of the OS 230, the mapping management table 231, the address management table 232, the data management table 233, and the non-volatile memory device property table 234, and executes the functions of the data staging unit 241, the functions of the data flushing unit 242, and the functions of the non-volatile memory data rearrangement unit 243.

The BIOS 250 includes a non-volatile memory management table 251 and a non-volatile memory management initialization processing unit 261. In other words, as some of the functions of the BIOS 250, the host computer 100 stores the non-volatile memory management table 251 and executes the functions of the non-volatile memory management initialization processing unit 261.

Of the units illustrated in FIG. 9, the explanations of the portions having similar functions corresponding to those of the units in FIG. 3 will be assigned the same reference numbers (100, 210, 230, 231, 241, 242, 250, and 261) and their explanations will be omitted. Comparing the configuration in FIG. 9 with the configuration in FIG. 3, the configuration in FIG. 9 differs from the configuration in FIG. 3 in that the OS 230 includes the address management table 232, the data management table 233, the non-volatile memory device property table 234, and the non-volatile memory data rearrangement unit 243, and the BIOS 250 includes the non-volatile memory management table 251. With respect to the other units, the example illustrated in FIG. 9 is similar to that illustrated in FIG. 3.

The address management table 232 is data indicating whether or not the data stored in non-volatile memories 143 is necessary.

FIG. 10 is a diagram illustrating an example of the data structure in the address management table 232. In the example illustrated in FIG. 10, the address management table 232 is configured as data in tabular form, wherein each row indicates whether or not the data is necessary.

Each row in the address management table 232 is provided with a "Logical address" column, an "Attributes" column, and a "Data" column. In the "Logical address" column, logical address areas are indicated by the start address and the last address.

The "Attributes" column contains information regarding attributes of the data in the logical address area indicated in the "Logical address" column in the same row. In the example illustrated in FIG. 10, a "Read" in the "Attributes" column indicates that the data is read-only data. A "Read/Write" in the "Attributes" column indicates that the data can be read and written.

The "Data" column contains information indicating whether or not the data in the logical address area indicated in the "Logical address" column in the same row is necessary. In the example illustrated in FIG. 10, an "Unnecessary" in the "Data" column indicates that data in the logical address area indicated in the "Logical address" column in the same row (data used before the power source of the host computer 100 was disconnected) is unnecessary after the power source of the host computer 100 is connected. A "Necessary" in the "Data" column indicates that data in the logical address area indicated in the "Logical address" column in the same row (data that was used before the power source of the host computer 100 was disconnected) is necessary even after the power source of the host computer 100 is connected.

The information in the "Data" column is set, for example, by a user.

The data management table 233 is data indicating the access status of data stored in the target memory device 140.

FIG. 11 is a diagram illustrating an example of the data structure in the data management table 233. In the example illustrated in FIG. 11, the data management table 233 is configured as data in tabular form, wherein each row indicates the data access status.

Each row in the data management table 233 is provided with a "No." column, a "Data" column, and a "Final read request date/time" column.

The "No." column indicates consecutive numbers starting at one. The "Data" column contains identification information for identifying the data. The "Final read request date/time" column contains information indicating the date and time of the latest read request of the data identified by the identification information in the "Data" column in the same row.

The non-volatile memory device property table 234 is data indicating the properties of each of the non-volatile memories 143.

FIG. 12 is a diagram illustrating an example of the data structure in the non-volatile memory device property table 234. In the example illustrated in FIG. 12, the non-volatile memory device property table 234 is configured as data in tabular form, and indicates property information for one type of non-volatile memory in one row.

Each row in the non-volatile memory device property table 234 is provided with a "No." column, a "Non-volatile memory no." column, a "Performance properties" column, a "Change in Properties" column, and a "Write lifetime [DWPD]" column.

The "No." column indicates consecutive numbers starting at one.

The "Non-volatile memory no." column contains an identification number for identifying the type of a non-volatile memory. As the identification number in this case, the model number of the non-volatile memory may be used, but there is no limitation thereto.

The "Performance properties" column indicates the speed of the memory. In the example illustrated in FIG. 12, the speed (for example, the quickness (shortness) of the latency) is indicated by three levels, namely, high, medium, and low, for both reading and writing.

The "Change in properties" column indicates the change over time in the speed of the memory.

The "Write lifetime [DWPD]" column indicates the "drive writes per day" (DWPD, i.e., the number of writes per day that is allowed in order to use the drive for the entire warranty period).

The data in the non-volatile memory device property table 234 can be obtained, for example, from a description in a catalog and by testing.

The non-volatile memory data rearrangement unit 243 executes the functions of the reuse space determination unit 325, the movement destination determination unit 326, and the movement processing unit 327 in the memory device management system 302 (FIG. 8).

The non-volatile memory management table 251 is data indicating the type of each of the non-volatile memories 143.

FIG. 13 is a diagram illustrating an example of the data structure in the non-volatile memory management table 251. In the example illustrated in FIG. 13, the non-volatile memory management table 251 is configured as data in tabular form, and indicates information relating to one non-volatile memory 143 in one row.

Each row in the non-volatile memory management table 251 is provided with a "Physical address" column, a "Memory" column, and a "Device type" column. The "Memory" column contains identification information for identifying each of the non-volatile memories 143 provided in the target memory device 140. In the example illustrated in FIG. 13, "PM1" indicates the non-volatile memory 143-1. "PM2" indicates the non-volatile memory 143-2. "PM3" indicates the non-volatile memory 143-3.

In the "Physical address" column, the physical addresses assigned to the non-volatile memory 143 associated with that row (the non-volatile memory 143 identified by the identification information in the "Memory" column of the row in which the "Physical address" column is contained) is indicated by the start address and the last address.

The "Device type" column contains information indicating the type of the memory. In the example illustrated in FIG. 13, a combination of the manufacturing company name and the model number is used as information indicating the type of memory.

Next, the operations of the memory device management system 302 will be explained with reference to FIG. 14.

Figure 14:
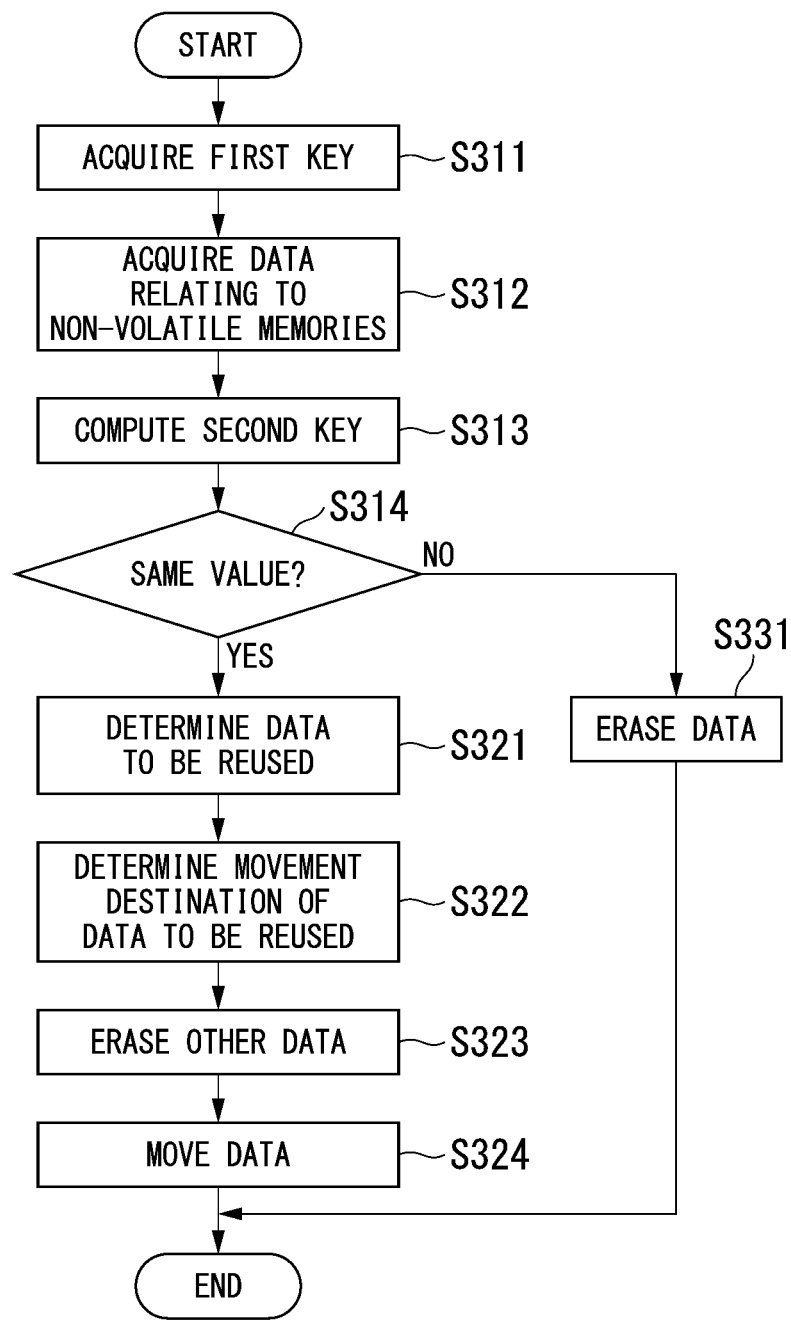
FIG. 14 is a diagram illustrating an example of the procedure in a process performed on data in a target memory device by the memory device management system in accordance with the second example embodiment.

FIG. 14 is a diagram illustrating an example of the procedure in the process performed by the memory device management system 302 on the data in the target memory device. The memory device management system 302 performs the process illustrated in FIG. 14 after the power source of the host computer 100 is connected, such as at the time of startup of the host computer 100.

The process in steps S311 to S314 illustrated in FIG. 14 is similar to the process in steps S211 to S214 illustrated in FIG. 7.

In step S314, in the case in which the equality determination unit 323 determines that the value of the first key and the value of the second key are different (step S314: NO), the process advances to step S331. The process in step S331 is similar to the process in step S221 illustrated in FIG. 7. After step S331, the memory device management system 302 ends the process illustrated in FIG. 14.

The process by which the memory device management system 302 acquires and stores the first key is similar to the process illustrated in FIG. 6.

In contrast, in the case in which the equality determination unit 323 determines that the value of the first key and the value of the second key are the same (step S314: YES), the reuse space determination unit 325 determines the data that is to be reused among the data stored in the target memory device 140 (step S321). For example, the reuse space determination unit 325 determines that the data indicated as being "Necessary" in the address management table 232 is data to be reused. In the address management table 232, a data area in the logical address space is indicated, and thus the reuse space determination unit 325 refers to the mapping management table 231 and converts the logical addresses into physical addresses. As a result thereof, the reuse space determination unit 325 determines, in the physical address space, the data that is to be reused among the data stored in the target memory device 140.

Next, the movement destination determination unit 326 determines the movement destination of the data to be reused (step S323).

For example, the movement destination determination unit 326 acquires information indicating the access frequency of the data to be reused, for at least one of reading and writing. To this end, the host computer 100 may record the data access history. Alternatively, the movement destination determination unit 326 may refer to the data management table 233 and determine that the read frequency is higher for data having the latest final read request date/time.

Additionally, the movement destination determination unit 326 obtains the access speeds in the physical address space. For example, the movement destination determination unit 326 refers to the non-volatile memory management table 251 and reads the physical addresses and type of each of the non-volatile memories 143, and refers to the non-volatile memory device property table 234 and reads the properties for each type of non-volatile memory. As a result thereof, the movement destination determination unit 326 can obtain the read speed and the write speed of the physical address space assigned to each of the non-volatile memories 143.

Furthermore, the movement destination determination unit 326 determines physical address spaces with higher access speeds as the movement destinations of data with higher access frequencies. For example, the movement destination determination unit 326 determines physical address spaces with faster read speeds as the movement destinations of data with higher read frequencies, and determines physical address spaces with faster write speeds as the movement destinations of data with higher write frequencies.

Alternatively, the movement destination determination unit 326 may determine physical address spaces with larger DWPDs (more possible writes) as the movement destinations of data with higher write frequencies.

Additionally, of the data stored in the target memory device 140, the data erasure processing unit 324 erases the data other than the data to be reused (step S323).

Furthermore, the movement processing unit 327 moves the data to be reused to the movement destination determined by the movement destination determination unit 326 (step S324).

After step S324, the memory device management system 302 ends the process illustrated in FIG. 14.

As described above, the reuse space determination unit 325 determines the data to be reused among the data stored in the target memory device 140. The movement destination determination unit 326 determines any of memory areas in the target memory device 140 as memory areas that are the movement destinations of the data that have been determined to be reused, on the basis of the properties of each of the non-volatile memories 143 constituting the target memory device 140. In the case in which it is determined that the value of the first key and the value of the second key are the same, the movement processing unit 327 moves the data that has been determined to be reused to the determined movement destinations.

With the memory device management system 302, data with a high access frequency can be arranged in non-volatile memories 143 with a fast access speed. For this reason, higher-speed processing can be expected in the host computer 100.

Third Example Embodiment

Figure 15:
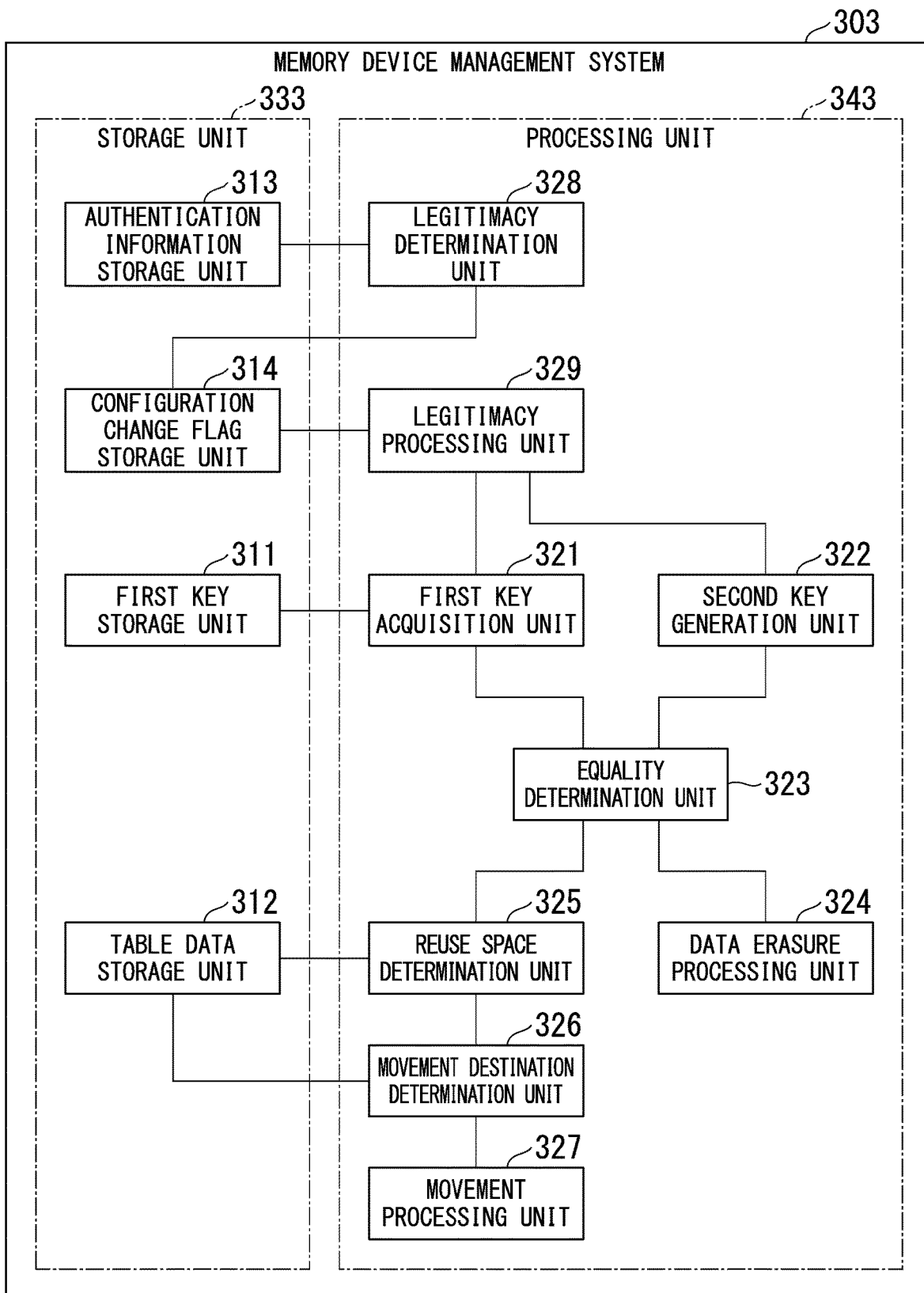
FIG. 15 is a diagram illustrating an example of the functional configuration of a memory device management system in accordance with a third example embodiment.

FIG. 15 is a diagram illustrating an example of the functional configuration of a memory device management system in accordance with the third example embodiment.

In the configuration illustrated in FIG. 15, the memory device management system 303 includes a first key storage unit 311, a table data storage unit 312, an authentication information storage unit 313, a configuration change flag storage unit 314, a first key acquisition unit 321, a second key generation unit 322, an equality determination unit 323, a data erasure processing unit 324, a reuse space determination unit 325, a movement destination determination unit 326, a movement processing unit 327, a legitimacy determination unit 328, and a legitimacy processing unit 329.

Additionally, in FIG. 15, each unit in the memory device management system 303 is included in a storage unit 333 or a processing unit 343. The first key storage unit 311, the table data storage unit 312, the authentication information storage unit 313, and the configuration change flag storage unit 314 are included in the storage unit 333. The first key acquisition unit 321, the second key generation unit 322, the equality determination unit 323, the data erasure processing unit 324, the reuse space determination unit 325, the movement destination determination unit 326, the movement processing unit 327, the legitimacy determination unit 328, and the legitimacy processing unit 329 are included in the processing unit 343.

Of the units in FIG. 15, the explanations of the portions having similar functions corresponding to those of the units illustrated in FIG. 8 will be assigned the same reference numbers (311, 312, 321, 322, 323, 324, 325, 326, 327) and their explanations will be omitted. The memory device management system 303 differs from the memory device management system 302 (FIG. 8) in that the storage unit 333 includes the authentication information storage unit 313 and the configuration change flag storage unit 314, and the processing unit 343 includes the legitimacy determination unit 328 and the legitimacy processing unit 329. With respect to the other units, the memory device management system 303 is similar to the memory device management system 302, the storage unit 333 is similar to the storage unit 332, and the processing unit 343 is similar to the processing unit 342.

The authentication information storage unit 313 stores authentication information. This authentication information is used when the configuration of a non-volatile memories 143 in the target memory device 140 is changed, to determine whether or not the change was made by an authorized person. A change by an authorized person is referred to as a legitimate change.

The authentication information stored in the authentication information storage unit 313 is not limited to that of a specific authentication scheme. For example, the authentication information storage unit 313 may store a password for password authentication. Alternatively, the authentication information storage unit 313 may store fingerprint data for fingerprint authentication. Alternatively, the authentication information storage unit 313 may store authentication information using each of multiple authentication schemes.

The configuration change flag storage unit 314 stores a configuration change flag. The configuration change flag is a flag indicating that the configuration of the non-volatile memories 143 in the target memory device 140 has been legitimately changed.

Hereinafter, the value of the configuration change flag is either "ON" or "OFF". The value of the configuration change flag being "ON" indicates that it has been determined that a change in the configuration of the non-volatile memories 143 in the target memory device 140 was authorized. The value of the configuration change flag being "OFF" indicates that it has not been determined that a change in the configuration of the non-volatile memories 143 in the target memory device 140 was authorized. Therefore, the value of the configuration change flag being "OFF" indicates that, when there has been a change in the configuration of the non-volatile memories 143, the change was illegitimate.

When the configuration of the non-volatile memories 143 in the target memory device 140 is changed, the legitimacy determination unit 328 determines whether or not the change was legitimate by authenticating the changer. When there is an advance notification that the configuration in the target memory device 140 will be changed, it is determined whether or not the change is legitimate before the power source of the host computer 100 is disconnected in order to change the configuration, and the determination result is reflected in the value of the configuration change flag.

The legitimacy determination unit 328 determines whether or not the configuration of the non-volatile memories 143 in the target memory device 140 has been legitimately changed after the power source of the host computer 100 is connected. Specifically, the legitimacy determination unit 328 determines whether or not the configuration of the non-volatile memories 143 in the target memory device 140 has been legitimately changed by referring to the value of the configuration change flag.

Figure 16:
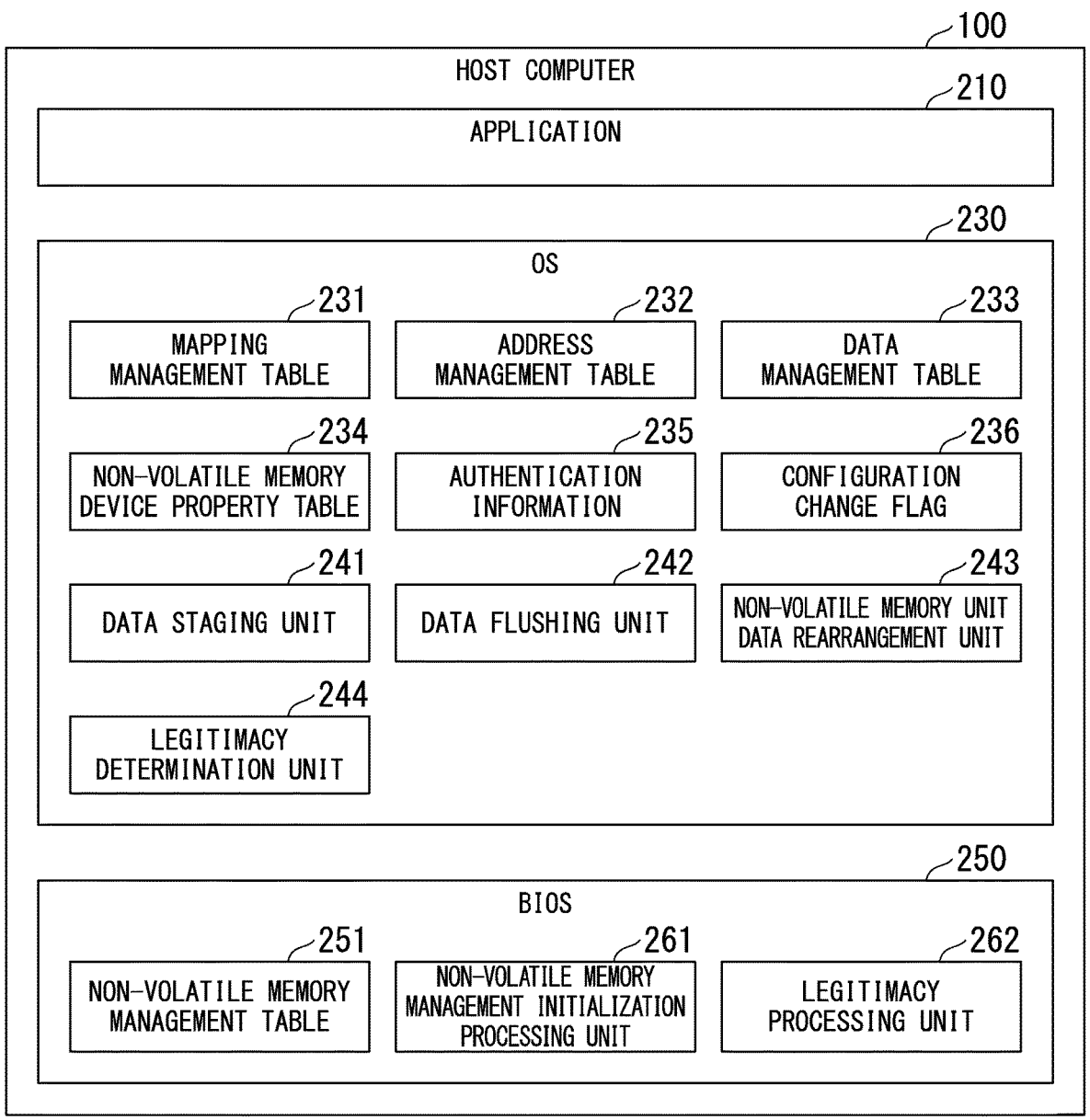
FIG. 16 is a diagram illustrating an example of the allocation of the functions of the memory device management system to software in a host computer in accordance with the third example embodiment.

FIG. 16 is a diagram illustrating an example of the allocation of the functions of the memory device management system 303 to software in the host computer 100. In the configuration illustrated in FIG. 16, the host computer 100 includes an application 210, an OS 230, and a BIOS 250. In other words, the host computer 100 runs the application 210, the OS 230, and the BIOS 250.

The OS 230 includes a mapping management table 231, an address management table 232, a data management table 233, a non-volatile memory device property table 234, authentication information 235, a configuration change flag 236, a data staging unit 241, a data flushing unit 242, a non-volatile memory data rearrangement unit 243, and a legitimacy determination unit 244. In other words, the host computer 100 stores, as some of the functions of the OS 230, the mapping management table 231, the address management table 232, the data management table 233, the non-volatile memory device property table 234, the authentication information 235, and the configuration change flag 236, and performs the functions of the data staging unit 241, the functions of the data flushing unit 242, the functions of the non-volatile memory data rearrangement unit 243, and the functions of the legitimacy determination unit 244.

The BIOS 250 includes a non-volatile memory management table 251, a non-volatile memory management initialization processing unit 261, and a legitimacy processing unit 262. In other words, as some of the functions of the BIOS 250, the host computer 100 stores the non-volatile memory management table 251 and performs the functions of the non-volatile memory management initialization processing unit 261 and the functions of the legitimacy processing unit 262.

Of the units illustrated in FIG. 16, the explanations of the portions having similar functions corresponding to those of the units in FIG. 9 will be assigned the same reference numbers (100, 210, 230, 231, 232, 233, 234, 241, 242, 243, 250, 251, 261) and their explanations will be omitted. Comparing the configuration illustrated in FIG. 16 with the configuration illustrated in FIG. 9, the configuration illustrated in FIG. 16 differs from the configuration illustrated in FIG. 9 in that the OS 230 includes the authentication information 235, the configuration change flag 236, and the legitimacy determination unit 244 and the BIOS 250 includes the legitimacy processing unit 262. With respect to the other units, the example illustrated in FIG. 16 is similar to that illustrated in FIG. 9.

The authentication information 235 is authentication information stored in the authentication information storage unit 313 (FIG. 15). The configuration change flag 236 is a configuration change flag stored in the configuration change flag storage unit 314. The legitimacy determination unit 244 performs the functions of the legitimacy determination unit 328. The legitimacy processing unit 262 executes the functions of the legitimacy processing unit 329.

Next, the operations of the memory device management system 303 will be explained with reference to FIG. 17 and FIG. 18.

Figure 17:
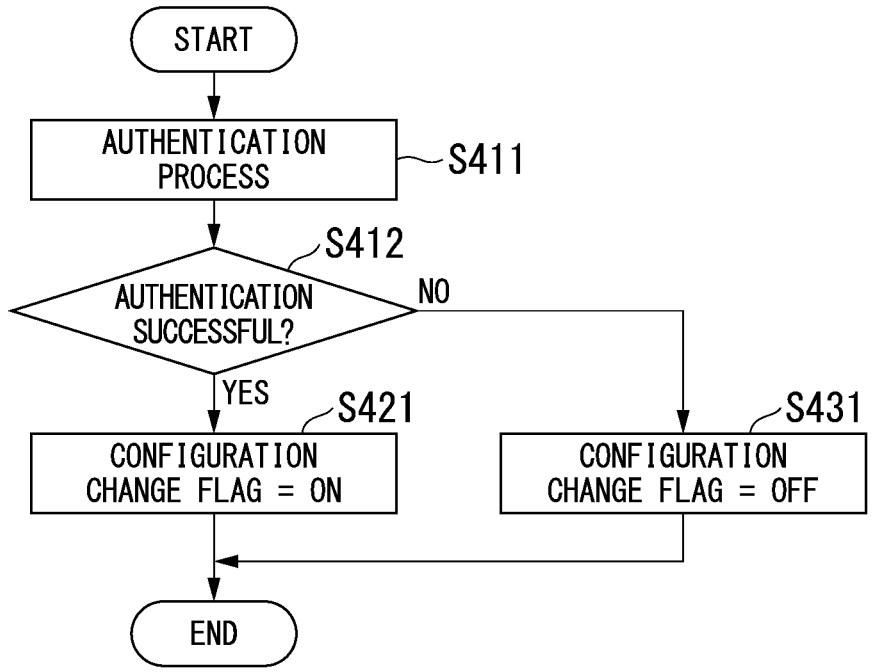
FIG. 17 is a diagram illustrating an example of the procedure in a process by which the memory device management system in accordance with the third example embodiment sets a value for a configuration change flag.

FIG. 17 is a diagram illustrating an example of the procedure in a process by which the memory device management system 303 sets a value for a configuration change flag. When there is an advance notification that the configuration of the non-volatile memories 143 in the target memory device 140 will be changed, the memory device management system 303 performs the process illustrated in FIG. 17. An advance notification that the configuration of the non-volatile memories 143 in the target memory device 140 will be changed is made, for example, by the person who is to change the configuration of the non-volatile memories 143 in the target memory device 140, by performing a user operation.

In the process illustrated in FIG. 17, the legitimacy determination unit 328 performs an authentication process as to whether or not the person who is to change the configuration of the non-volatile memories 143 in the target memory device 140 is an authorized person (step S411). The legitimacy determination unit 328 performs an authentication process using the authentication information stored in the authentication information storage unit 313. As mentioned above, the authentication performed by the legitimacy determination unit 328 is not limited to a specific type of authentication.

Next, the legitimacy determination unit 328 determines whether or not the authentication was successful (step S412). Successful authentication indicates that the person who is to change the configuration of the non-volatile memories 143 in the target memory device 140 is an authorized person. Failed authentication indicates that the person who is to change the configuration of the non-volatile memories 143 in the target memory device 140 is unauthorized.

In step S412, if it is determined that the authentication has succeeded (step S412: YES), then the legitimacy determination unit 328 sets the value of the configuration change flag to "ON" (step S421).

After step S421, the memory device management system 303 ends the process illustrated in FIG. 17.

In contrast, in step S412, if it is determined that the authentication has failed (step S412: NO), then the legitimacy determination unit 328 sets the value of the configuration change flag to "OFF" (step S421).

After step S421, the memory device management system 303 ends the process illustrated in FIG. 17.

Measures may be taken to prevent modification of the configuration change flag. For example, the configuration change flag may be encrypted.

Figure 18:
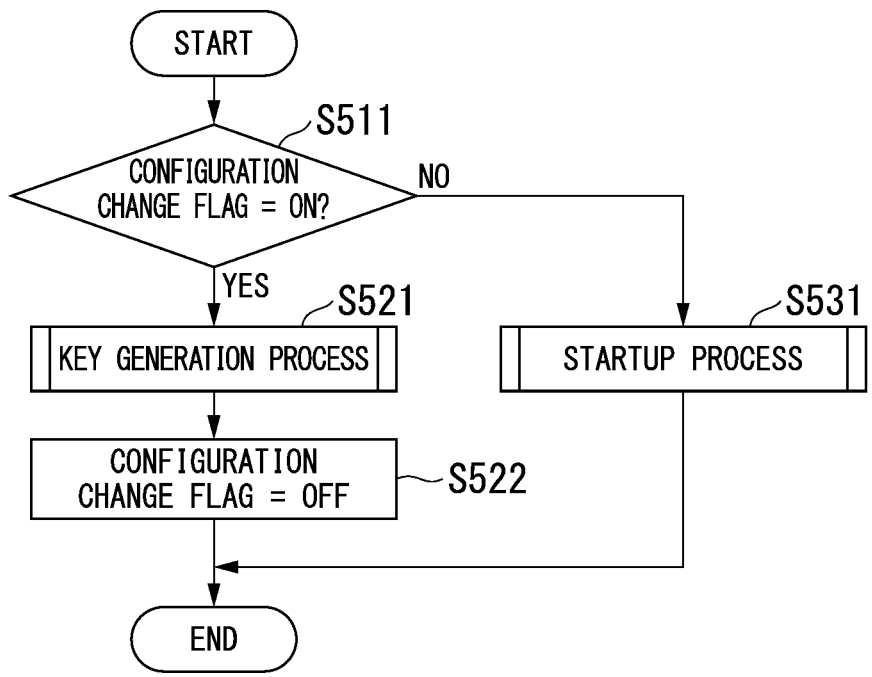
FIG. 18 is a diagram illustrating an example of the procedure in a process performed by the memory device management system in accordance with the third example embodiment after the power source of the host computer is connected.

FIG. 18 is a diagram illustrating an example of the procedure in a process performed by the memory device management system 303 after the power source of the host computer 100 is connected. For example, the memory device management system 303 performs the process illustrated in FIG. 18 at the time of startup of the host computer 100.

In the process illustrated in FIG. 18, the legitimacy processing unit 329 determines whether or not the value of the configuration change flag is "ON" (step S511).

In the case that the legitimacy processing unit 329 determines that the value of the configuration change flag is "ON" (step S511: YES), the memory device management system 303 performs the process illustrated in FIG. 6 (step S521). The memory device management system 303 performs the process illustrated in FIG. 6, thereby generating a first key and storing the first key in the first key storage unit 311.

After step S521, the legitimacy processing unit 329 sets the value of the configuration change flag to "OFF" (step S522).

After step S522, the memory device management system 303 ends the process illustrated in FIG. 18.

In contrast, in the case that the legitimacy processing unit 329 determines that the value of the configuration change flag is "OFF" at step S511 (step S511: NO), the memory device management system 303 performs the process in illustrated FIG. 14 (step S531).

After step S531, the memory device management system 303 ends the process illustrated in FIG. 18.

As explained above, when the configuration of the non-volatile memories 143 in the target memory device 140 is changed, the legitimacy determination unit 328 determines the legitimacy of the change. The legitimacy processing unit 329 blocks the erasure of data by the data erasure processing unit 324 if it is determined that the change is legitimate.

Thus, one or more non-volatile memories 143 can be extracted from the target memory device 140 and put to another use, and for this reason, the memories can be effectively used. Additionally, by determining that the configuration of the non-volatile memories 143 in the target memory device 140 has been legitimately changed, the data stored in the target memory device 140 can be reused, and for this reason, the processing in the host computer 100 can be made faster.

In this way, with the memory device management system 303, it is possible to ensure the effective usage of the non-volatile memories 143 while also allowing high-speed processing in the host computer 100.

Next, the configuration of an example embodiment of the present invention will be explained with reference to FIG. 19 and FIG. 20.

Figure 19:
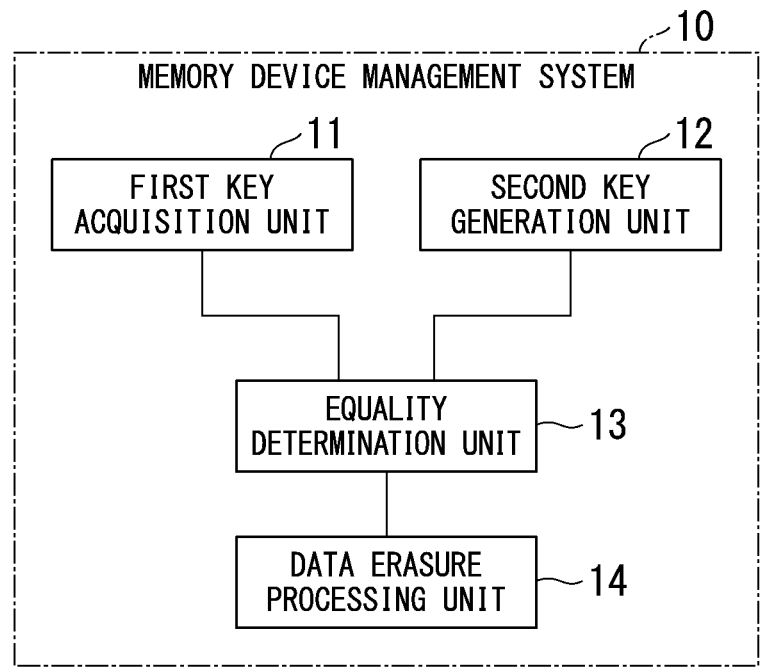
FIG. 19 is a diagram illustrating an example of the configuration of the memory device management system in accordance with an example embodiment.

FIG. 19 is a diagram illustrating an example of the configuration of a memory device management system in accordance with the example embodiment. A memory device management system 10 illustrated in FIG. 19 includes a first key acquisition unit 11, a second key generation unit 12, an equality determination unit 13, and a data erasure processing unit 14.

In this configuration, the first key acquisition unit acquires a first key. The second key generation unit 12 generates a second key in accordance with the configuration in the memory device that is the management target. The equality determination unit 13 determines the equality between the value of the first key and the value of the second key. If it is determined that the value of the first key and the value of the second key are different, then the data erasure processing unit 14 erases the data stored in the memory device that is the management target.

With the memory device management system 10, by comparing the value of the first key with the value of the second key, it is possible to detect cases in which there is a possibility of illegitimate activity, such as cases in which the configuration of memories in the memory device has been changed, and cases in which the memory device has been removed from another apparatus and mounted in the computer being processed by the memory device management system 10.

In the case in which a change in the configuration of the memories in the memory device is not detected, the probability that there has been illegitimate activity can be considered to be relatively low. In this case, the memory device management system 10 does not erase the data stored in the memory device. By making use of data stored in the memory device, there is no need, for example, to reupload data from a secondary storage unit such as a hard disk to the memory device. For this reason, it is possible to ensure that the data stored in the memory device is effectively used.

In contrast, in the case in which a change is detected, the probability of illegitimate activity can be considered to be relatively high. In this case, the memory device management system 10 erases the data stored in the memory device. As a result thereof, the possibility that the data stored in the memory device has been illegitimately acquired can be reduced. For this reason, it is possible to ensure the prevention of illegitimate activity with respect to the data stored in the memory device.

In this way, with the memory device management system 10, it is possible to ensure the effective use of the data stored in the memory device while also preventing illegitimate acquisition of this data.

Figure 20:
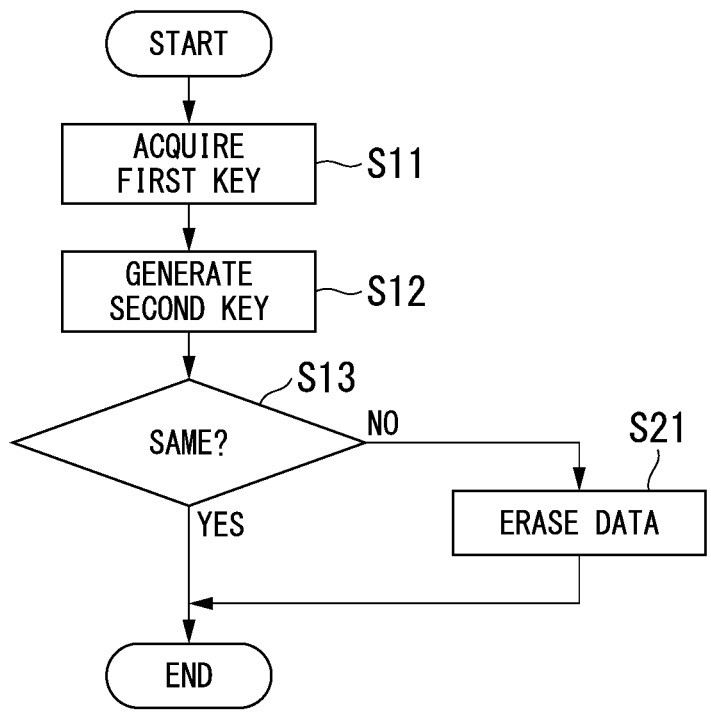
FIG. 20 is a diagram illustrating an example of the processing steps in a memory device management method in accordance with an example embodiment.

FIG. 20 is a diagram illustrating an example of the procedure in a process of a memory device management method in accordance with an example embodiment.

The memory device management method illustrated in FIG. 20 includes a first key acquisition step (step S11), a second key generation step (step S12), an equality determination step (step S13), and a data erasure step (step S21).

In this configuration, the first key is acquired in the first key acquisition step (step S11). In the second key generation step (step S12), a second key is generated in accordance with the configuration in the memory device that is the management target. In the equality determination step (step S13), the equality between the value of the first key and the value of the second key is determined. In the data erasure step (step S21), in the case in which it is determined that the value of the first key and the value of the second key are different, the data stored in the memory device is erased.

With the memory device management method illustrated in FIG. 20, by comparing the value of the first key with the value of the second key, it is possible to detect cases in which there is a possibility of illegitimate activity, such as cases in which the configuration of the memories in the memory device has been changed, and cases in which the memory device has been removed from another apparatus and mounted in the computer to which the memory device management method is being applied.

In the case in which a change in the configuration of the memories in the memory device is not detected, the probability that there has been illegitimate activity can be considered to be relatively low. In this case, in the memory device management method illustrated in FIG. 20, the data stored in the memory device is not erased. By making use of data stored in the memory device, there is no need, for example, to reupload data from a secondary storage unit such as a hard disk to the memory device. For this reason, it is possible to ensure that the data stored in the memory device is effectively used.

In contrast, in the case in which a change is detected, the probability that there has been illegitimate activity can be considered to be relatively high. In this case, in the memory device management method, the data stored in the memory device is erased. As a result thereof, the possibility that the data stored in the memory device has been illegitimately acquired can be reduced. For this reason, it is possible to ensure the prevention of illegitimate activity with respect to the data stored in the memory device.

With the memory device management method illustrated in FIG. 20, it is possible to ensure the effective use of the data stored in the memory device while also preventing illegitimate acquisition of the data.

Figure 21:
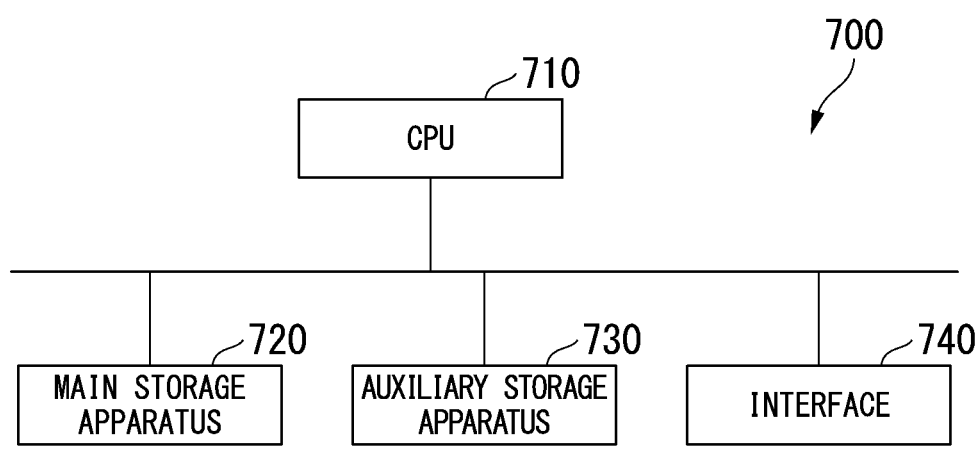
FIG. 21 is a schematic block diagram illustrating the configuration of a computer in accordance with at least one example embodiment.

FIG. 21 is a schematic block diagram illustrating the configuration of a computer in accordance with at least one example embodiment.

In the configuration illustrated in FIG. 21, a computer 700 includes a CPU 710, a main storage apparatus 720, an auxiliary storage apparatus 730, and an interface 740.

One or more of the above-mentioned memory device management systems 301, 302, and 303 may be installed in the computer 700. In that case, the operations of the respective processing units mentioned above are stored in the auxiliary storage apparatus 730 in the form of a program. The CPU 710 reads the program from the auxiliary storage apparatus 730 and loads it in the main storage apparatus 720, then executes the above-mentioned processes in accordance with the program. Additionally, the CPU 710 secures storage areas corresponding to the respective storage units mentioned above in the main storage apparatus 720 in accordance with the program. Communication is carried out between the respective apparatuses and other apparatuses by the interface 740, which has a communication function, the communication being performed in accordance with control by the CPU 710. The auxiliary storage apparatus 730 is a non-volatile (non-transitory) recording medium such as a compact disc (CD) or a digital versatile disc DVD).

In the case in which the memory device management system 301 is installed in the computer 700, the operations of the respective units among the processing unit 341 are stored in the auxiliary storage apparatus 730 in the form of a program. The CPU 710 reads the program from the auxiliary storage apparatus 730 and loads it in the main storage apparatus 720, then executes the above-mentioned processes in accordance with the program.

Additionally, the CPU 710 secures storage areas corresponding to the respective units among the storage unit 331 in the main storage apparatus 720 in accordance with the program.

In the case in which the memory device management system 302 is installed in the computer 700, the operations of the respective units among the processing unit 342 are stored in the auxiliary storage apparatus 730 in the form of a program. The CPU 710 reads the program from the auxiliary storage apparatus 730 and loads it in the main storage apparatus 720, then executes the above-mentioned processes in accordance with the program.

Additionally, the CPU 710 secures storage areas corresponding to the respective units among the storage unit 332 in the main storage apparatus 720 in accordance with the program.

In the case in which the memory device management system 303 is installed in the computer 700, the operations of the respective units among the processing unit 343 are stored in the auxiliary storage apparatus 730 in the form of a program. The CPU 710 reads the program from the auxiliary storage apparatus 730 and loads it in the main storage apparatus 720, then executes the above-mentioned processes in accordance with the program.

Additionally, the CPU 710 secures storage areas corresponding to the respective units among the storage unit 333 in the main storage apparatus 720 in accordance with the program.

It should be noted that a program for executing all or some of the processes performed by the memory device management systems 301, 302, or 303 may be recorded in a computer-readable recording medium, and the program recorded on this recording medium may be loaded in a computer system and executed to perform the processes for the respective units. It should be noted that the "computer system" mentioned here includes an operating system (OS) and hardware such as peripheral devices.

Additionally, a "computer-readable recording medium" refers to portable media such as flexible disks, magneto-optic disks, read-only memories (ROMs), and compact disc read-only memories (CD-ROMs), and to storage devices that are internally installed in computer systems, such as hard disks. Additionally, the above-mentioned program may be for realizing some of the aforementioned functions, and the aforementioned functions may be further realized by combining them with programs already recorded in the computer system.

While example embodiments of the present invention have been explained in detail by referring to drawings above, the specific configuration is not limited to these example embodiments, and designs and the like within the range not departing from the spirit of the present invention are also included.

What is claimed is:

1. A memory device management system comprising:
   a memory configured to store instructions; and
   a processor configured to execute the instructions to:
   acquire a first key that is stored in a first key storage that is provided in a non-volatile storage device external to a target memory device that is a management target;
   generate a second key based on data that is uniquely determined in accordance with a configuration of a non-volatile memory included in the target memory device;
   determine an equality between a value of the first key and a value of the second key;
   erase data stored in the target memory device in a case of a determination that the value of the first key and the value of the second key are different;
   determine data to be reused among the data stored in the target memory device;
   determine, among memory areas in the target memory device, a memory area to be a movement destination of the data determined to be reused on the basis of properties of individual memories in the target memory device; and
   move the data determined to be reused to the determined movement destination in a case of a determination that the value of the first key and the value of the second key are the same,
   wherein the properties of the individual memories comprise read and write speeds of the individual memories, change over time in speed of the individual memories, and write lifetime of the individual memories.

2. The memory device management system according to claim 1, wherein the processor is configured to execute the instructions to:
   determine a legitimacy of a change in a case in which a memory configuration in the target memory device is changed; and
   block erasure of the data in a case in which the change is determined to be legitimate.

3. A memory device management method comprising:
   acquiring a first key that is stored in a first key storage that is provided in a non-volatile storage device external to a target memory device that is a management target;
   generating a second key based on data that is uniquely determined in accordance with a configuration of a non-volatile memory included in the target memory device;
   determining an equality between a value of the first key and a value of the second key;

erasing data stored in the target memory device in a case of a determination that the value of the first key and the value of the second key are different;

determining data to be reused among the data stored in the target memory device;

determining, among memory areas in the target memory device, a memory area to be a movement destination of the data determined to be reused on the basis of properties of individual memories in the target memory device; and moving the data determined to be reused to the determined movement destination in a case of a determination that the value of the first key and the value of the second key are the same, wherein the properties of the individual memories comprise read and write speeds of the individual memories, change over time in speed of the individual memories, and write lifetime of the individual memories.

4. A non-transitory computer-readable recording medium storing a program for causing a computer to execute:

acquiring a first key that is stored in a first key storage that is provided in a non-volatile storage device external to a target memory device that is a management target;

generating a second key based on data that is uniquely determined in accordance with a configuration of a non-volatile memory included in the target memory device;

determining an equality between a value of the first key and a value of the second key;

erasing data stored in the target memory device in a case of a determination that the value of the first key and the value of the second key are different;

determining data to be reused among the data stored in the target memory device;

determining, among memory areas in the target memory device, a memory area to be a movement destination of the data determined to be reused on the basis of properties of individual memories in the target memory device; and moving the data determined to be reused to the determined movement destination in a case of a determination that the value of the first key and the value of the second key are the same, wherein the properties of the individual memories comprise read and write speeds of the individual memories, change over time in speed of the individual memories, and write lifetime of the individual memories.

5. The memory device management system according to claim 1, wherein the processor is configured to execute the instructions to determine the movement destination of the data determined to be reused on the basis of read frequencies and write frequencies of the data determined to be reused and read times and write times of the individual memories.

6. The memory device management system according to claim 1, wherein the processor is configured to execute the instructions to determine the movement destination of the data determined to be reused on the basis of write frequencies of the data determined to be reused and write lifetime of the individual memories.

7. The memory device management system according to claim 1, wherein the data includes a serial number of the non-volatile memory.

* * * * *